(12) United States Patent
Igarashi et al.

(10) Patent No.: US 9,007,723 B1
(45) Date of Patent: Apr. 14, 2015

(54) MICROWAVE-ASSISTED MAGNETIC RECORDING (MAMR) HEAD EMPLOYING ADVANCED CURRENT CONTROL TO ESTABLISH A MAGNETIC RESONANCE STATE

(71) Applicant: HGST Netherlands B.V., Amsterdam (NL)

(72) Inventors: Masukazu Igarashi, Kawagoe (JP); Masato Shiimoto, Odawara (JP); Masato Matsubara, Yokohama (JP); Yo Sato, Odawara (JP); Kenji Sugiura, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/106,390

(22) Filed: Dec. 13, 2013

(51) Int. Cl.
  *G11B 5/127* (2006.01)
  *G11B 27/36* (2006.01)
(52) U.S. Cl.
  CPC ...................................... *G11B 5/127* (2013.01)
(58) Field of Classification Search
  USPC ........................................ 360/125.3, 128, 31
  See application file for complete search history.

(56) References Cited

U.S. PATENT DOCUMENTS

| | | |
|---|---|---|
| 4,720,834 A | 1/1988 | Yamamoto et al. |
| 4,879,724 A | 11/1989 | Matsumoto et al. |
| 5,022,042 A | 6/1991 | Bradley |
| 5,444,730 A | 8/1995 | Mizutani |
| 6,122,304 A | 9/2000 | Ohyama |
| 6,320,888 B1 | 11/2001 | Tanaka et al. |

(Continued)

FOREIGN PATENT DOCUMENTS

| | | | |
|---|---|---|---|
| CN | 101383152 A | * | 3/2009 |
| JP | 62001295 | | 1/1987 |

(Continued)

OTHER PUBLICATIONS

Igarashi, M., et al., "Oscillation Feature of Planar Spin-Torque Oscillator for Microwave-Assisted Magnetic Recording," IEEE Transactions on Magnetics, vol. 46, No. 10, Oct. 2010, pp. 3738-3741.

(Continued)

*Primary Examiner* — Will J Klimowicz
(74) *Attorney, Agent, or Firm* — Zilka-Kotab, PC

(57) ABSTRACT

In one embodiment, a microwave-assisted magnetic recording (MAMR) head includes a main pole configured to write data to a magnetic medium using a write magnetic field, a write coil, wherein the write magnetic field is produced by the main pole upon a recording current, $I_w$, being provided to the write coil, and a spin torque oscillator (STO) positioned near the main pole, the STO being configured to provide a high-frequency assistance magnetic field to the magnetic medium upon a STO drive current, $I_{STO}$, being provided to the STO, wherein the STO drive current, $I_{STO}$, is ramped-up prior to the recording current, $I_w$, being provided to the write coil in order to begin a write operation for writing data to the magnetic medium. A method of operation for the MAMR head and an apparatus including the MAMR head are also described according to additional embodiments.

20 Claims, 21 Drawing Sheets

(56) References Cited

U.S. PATENT DOCUMENTS

| | | |
|---|---|---|
| 6,445,521 B1 | 9/2002 | Schaff et al. |
| 6,738,208 B2 | 5/2004 | Dakroub |
| 6,774,626 B2 | 8/2004 | Abe |
| 7,088,746 B2 | 8/2006 | Hashimoto et al. |
| 7,102,838 B2 | 9/2006 | Kim et al. |
| 7,791,829 B2 * | 9/2010 | Takeo et al. ............. 360/55 |
| 7,864,635 B2 | 1/2011 | Shimizu |
| 7,921,436 B2 | 4/2011 | Shimizu et al. |
| 7,982,996 B2 | 7/2011 | Smith et al. |
| 8,009,379 B2 | 8/2011 | Williams |
| 8,027,118 B2 | 9/2011 | Ezawa et al. |
| 8,611,034 B2 * | 12/2013 | Kobayashi et al. ............. 360/59 |
| 8,643,972 B2 * | 2/2014 | Shiroishi et al. ............. 360/59 |
| 8,687,319 B2 * | 4/2014 | Igarashi et al. ......... 360/125.03 |
| 2008/0019040 A1 | 1/2008 | Zhu et al. |
| 2009/0059417 A1 * | 3/2009 | Takeo et al. ............. 360/75 |
| 2009/0310459 A1 | 12/2009 | Gage et al. |
| 2011/0128829 A1 | 6/2011 | Nishida et al. |
| 2011/0164334 A1 | 7/2011 | Jin et al. |
| 2011/0216435 A1 | 9/2011 | Shiimoto et al. |
| 2011/0216635 A1 | 9/2011 | Matsumoto |
| 2011/0248710 A1 | 10/2011 | Sato et al. |
| 2013/0083423 A1 * | 4/2013 | Shiroishi et al. ............. 360/75 |
| 2013/0258514 A1 * | 10/2013 | Kobayashi et al. ............. 360/46 |
| 2014/0118861 A1 * | 5/2014 | Funayama ............. 360/119.02 |

FOREIGN PATENT DOCUMENTS

| | | | |
|---|---|---|---|
| JP | 2000012965 | | 1/2000 |
| JP | 2009064499 A | * | 3/2009 |
| JP | 2012053950 A | * | 3/2012 |
| JP | 5172004 | | 3/2013 |
| KR | 2009031983 A | * | 3/2009 |
| SU | 851216 | | 7/1981 |

OTHER PUBLICATIONS

Zhu, J., et al., "Microwave Assisted Magnetic Recording Utilizing Perpendicular Spin Torque Oscillator With Switchable Perpendicular Electrodes," IEEE Transactions on Magnetics, vol. 46, No. 3, Mar. 2010, pp. 751-757.

* cited by examiner

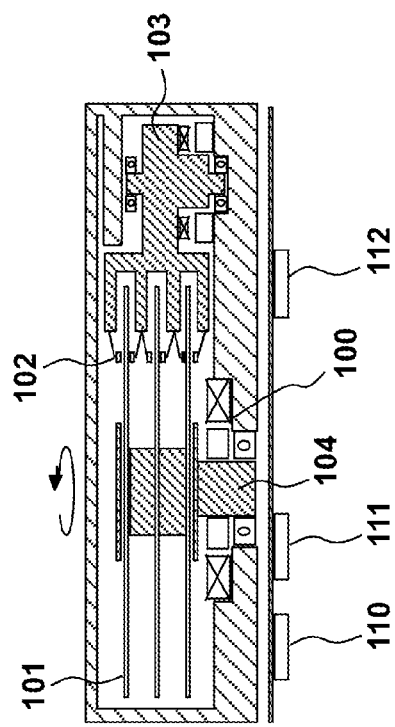
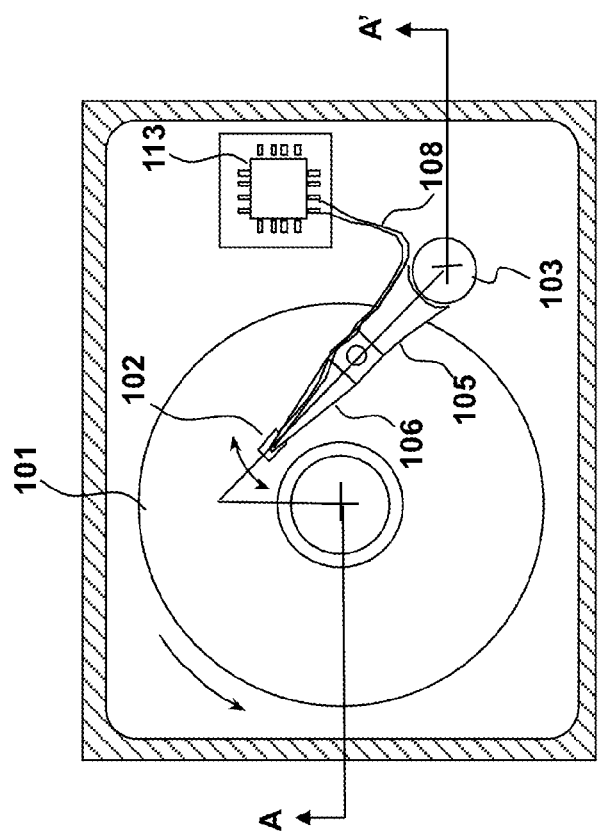
FIG. 23B
FIG. 23A

MICROWAVE-ASSISTED MAGNETIC RECORDING (MAMR) HEAD EMPLOYING ADVANCED CURRENT CONTROL TO ESTABLISH A MAGNETIC RESONANCE STATE

FIELD OF THE INVENTION

The present invention relates to magnetic data recording and storage, and more particularly, this invention relates to a microwave-assisted magnetic recording (MAMR) head that employs advanced write current and/or spin torque oscillator (STO) current control to establish a magnetic resonance state.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume, and to access this information more efficiently. A technical approach to this desire is to increase the capacity by increasing the recording density of the HDD. To accomplish efficient extraction and distribution of such a large volume of information, the use of storage disks onto which a large volume of information is able to be input and output at high speed is appropriate. An inherent problem in the use of magnetic disks for this purpose is that, accompanying recording density increases, thermal fluctuations cause a decrease in a recorded signal level. This is because a magnetic recording medium constitutes an agglomerate of magnetized fine crystals, wherein thermal fluctuations cause a reduction in the volume of these fine crystals. To produce what is regarded as a sufficient thermal fluctuation-resistance stability, it is thought that the value of the oft-employed thermal fluctuation index $K\beta$ (where $K\beta=K_u V/kT$, with $K_u$ being magnetic anisotropy, V being particle volume, T being absolute temperature, and k being the Boltzmann factor) should be not less than about 70. Assuming a fixed $K_u$ and T (based on material used and operating environment), the smaller the particle volume V becomes, the more likely it is that magnetization reversal due to thermal fluctuation will occur. In the absence of a reduction in the particle volume V accompanying an increase in the recording density increase and a decrease in the volume of recording film occupied by a single bit, thermal fluctuations become significant. When magnetic anisotropy $K_u$ is increased for the purpose of suppressing these fluctuations, the magnetic field of the magnetization reversal required for magnetic recording exceeds the recording magnetic field that is able to be generated by the recording head (and specifically the write element), and recording is rendered impossible.

Several attempts have been made to overcome these deficiencies. In one such attempt, as described in U.S. Patent Application Publication No. US 2008/0019040, a MAMR technique is described. As shown in FIG. 1, recording using this MAMR technique involves the application of not only a write magnetic field 301 ($H_w$) from a perpendicular main pole 305 of a magnetic recording head 300, but also the application of a high-frequency assistance microwave magnetic field 302 ($H_{hf}$) from a magnetic field generating layer (FGL) 303 of a spin torque oscillator (STO) 308 arranged adjacent to the main pole 305 onto a magnetic recording medium 307 having large magnetic anisotropy that, as a result, establishes the target recording region as a magnetic resonance state and, in turn, induces magnetization and reduces the magnetic field for magnetization reversal. Furthermore, a gap magnetic field 309 ($H_{gap}$) is produced between the main pole 305 and the opposite pole or trailing shield 306.

This allows for recording to be performed in the microwave irradiated range of the magnetic recording medium 307 which corresponds to a high recording density in excess of about 1 Tbit/in$^2$ at which, in a conventional magnetic head, recording had proved problematic due to the inadequate recording magnetic field. However, the inherent magnetization reversal of the pinned layer 304 in the STO 308 is both problematic and time-consuming and, accordingly, the high-speed information transfer write efficiency of this apparatus is poor.

Japanese Patent No. 5172004 discloses a method in which a two-layer FGL is employed as a high-frequency magnetic field source. The FGL does not comprise a pinned layer, but instead rotates (in an antiparallel direction) while maintaining the antiparallel magnetization relationship of the layers. However, this structure also has problems associated with it in regard to reversal speed. Accordingly, it would be beneficial to have a MAMR head which is capable of fast high-density magnetic recording.

SUMMARY

In one embodiment, a microwave-assisted magnetic recording (MAMR) head includes a main pole configured to write data to a magnetic medium using a write magnetic field, a write coil, wherein the write magnetic field is produced by the main pole upon a recording current, $I_w$, being provided to the write coil, and a spin torque oscillator (STO) positioned near the main pole, the STO being configured to provide a high-frequency assistance magnetic field to the magnetic medium upon a STO drive current, $I_{STO}$, being provided to the STO, wherein the STO drive current, $I_{STO}$, is ramped-up prior to the recording current, $I_w$, being provided to the write coil in order to begin a write operation for writing data to the magnetic medium.

In another embodiment, a method for using a MAMR head includes energizing a STO positioned near a main pole of the MAMR head to provide a high-frequency assistance magnetic field by providing a STO drive current, $I_{STO}$, to the STO, and energizing a write coil to produce a write magnetic field via the main pole by providing a recording current, $I_w$, to the write coil after waiting for a predetermined time delay such that the STO drive current, $I_{STO}$, is ramped-up prior to the recording current, $I_w$, being provided to the write coil in order to begin a write operation for writing data to a magnetic medium.

According to another embodiment, an apparatus includes at least one MAMR head, each MAMR head including a main pole configured to write data to a magnetic medium using a write magnetic field, a write coil, wherein the write magnetic field is produced by the main pole upon a recording current, $I_w$, being provided to the write coil, a STO positioned near the main pole, the STO being configured to provide a high-frequency assistance magnetic field to the magnetic medium upon a STO drive current, $I_{STO}$, being provided to the STO, the magnetic medium, a drive mechanism for passing the magnetic medium over the at least one MAMR head, and a controller electrically coupled to the at least one MAMR head for controlling operation of the at least one MAMR head, the controller being configured to: provide the STO drive current, $I_{STO}$, to the STO to provide the high-frequency assistance magnetic field, provide the recording current, $I_w$, to the write coil to produce the write magnetic field via the main pole, determine optimum recording conditions for the MAMR head based on alteration of $I_{STO}$ and $I_w$ via writing to the magnetic medium and subsequent reading from the magnetic medium of a predetermined test signal, ramp-up the STO drive current, $I_{STO}$, prior to providing the recording current, $I_w$, to the write coil in order to begin a write operation for writing data to the magnetic medium, and ramp-down the recording current, $I_w$, prior to reducing the STO drive current, $I_{STO}$, in order to cease the write operation for writing data to the magnetic medium.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 23A is a top schematic view of a magnetic recording device, according to one embodiment.

FIG. 23B is a cross-sectional view along the line A-A' of FIG. 23A, according to one embodiment.

DETAILED DESCRIPTION

Figure 1:
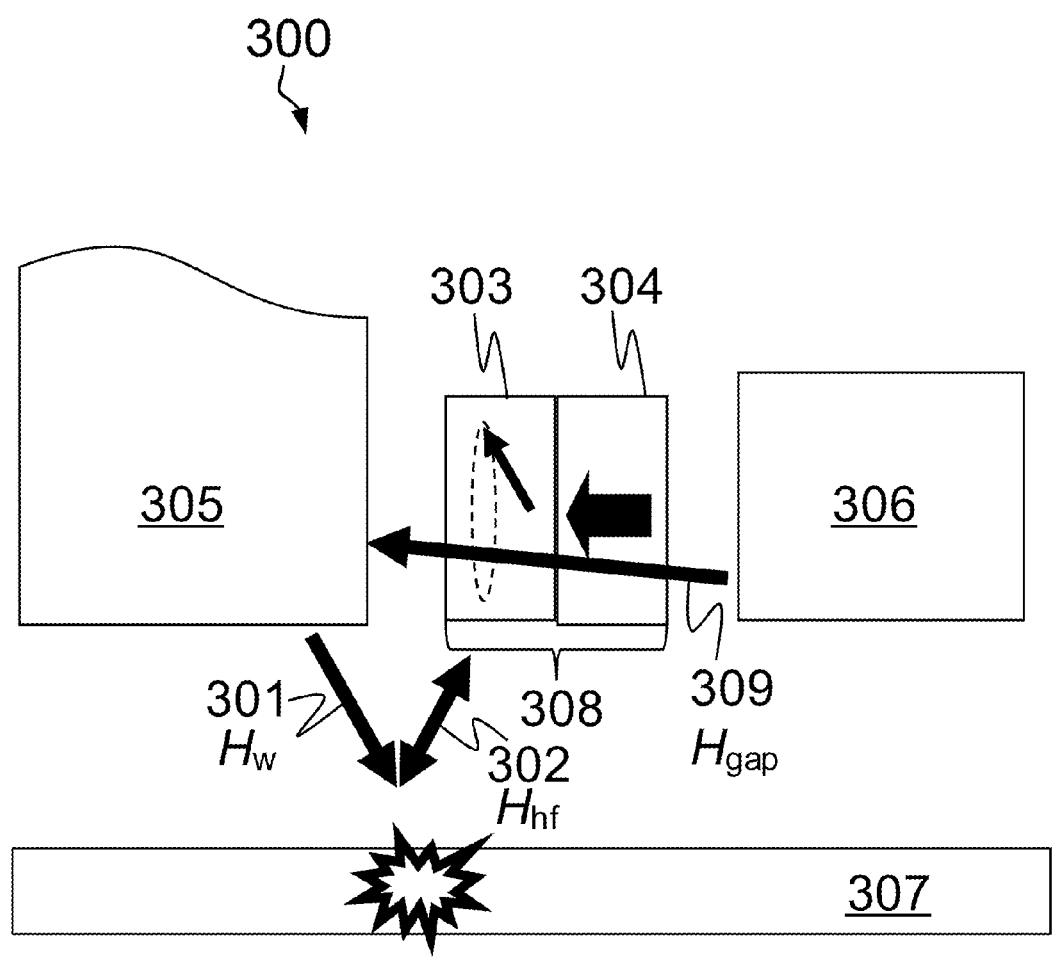
FIG. 1 is a schematic diagram of microwave-assisted recording (MAMR).

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based microwave-assisted magnetic recording (MAMR) storage systems, as well as operation and/or component parts thereof.

In one general embodiment, a MAMR head includes a main pole configured to write data to a magnetic medium using a write magnetic field, a write coil, wherein the write magnetic field is produced by the main pole upon a recording current, $I_w$, being provided to the write coil, and a spin torque oscillator (STO) positioned near the main pole, the STO being configured to provide a high-frequency assistance magnetic field to the magnetic medium upon a STO drive current, $I_{STO}$, being provided to the STO, wherein the STO drive current, $I_{STO}$, is ramped-up prior to the recording current, $I_w$, being provided to the write coil in order to begin a write operation for writing data to the magnetic medium.

In another general embodiment, a method for using a MAMR head includes energizing a STO positioned near a main pole of the MAMR head to provide a high-frequency assistance magnetic field by providing a STO drive current, $I_{STO}$, to the STO, and energizing a write coil to produce a write magnetic field via the main pole by providing a recording current, $I_w$, to the write coil after waiting for a predetermined time delay such that the STO drive current, $I_{STO}$, is ramped-up prior to the recording current, $I_w$, being provided to the write coil in order to begin a write operation for writing data to a magnetic medium.

According to another general embodiment, an apparatus includes at least one MAMR head, each MAMR head including a main pole configured to write data to a magnetic medium using a write magnetic field, a write coil, wherein the write magnetic field is produced by the main pole upon a recording current, $I_w$, being provided to the write coil, and a STO positioned near the main pole, the STO being configured to provide a high-frequency assistance magnetic field to the magnetic medium upon a STO drive current, $I_{STO}$, being provided to the STO, the magnetic medium, a drive mechanism for passing the magnetic medium over the at least one MAMR head, and a controller electrically coupled to the at least one MAMR head for controlling operation of the at least one MAMR head, the controller being configured to: provide the STO drive current, $I_{STO}$, to the STO to provide the high-frequency assistance magnetic field, provide the recording current, $I_w$, to the write coil to produce the write magnetic field via the main pole, determine optimum recording conditions for the MAMR head based on alteration of $I_{STO}$ and $I_w$ via writing to the magnetic medium and subsequent reading from the magnetic medium of a predetermined test signal, ramp-up the STO drive current, $I_{STO}$, prior to providing the recording current, $I_w$, to the write coil in order to begin a write operation for writing data to the magnetic medium, and ramp-down the recording current, $I_w$, prior to reducing the STO drive current, $I_{STO}$, in order to cease the write operation for writing data to the magnetic medium.

Figure 2:
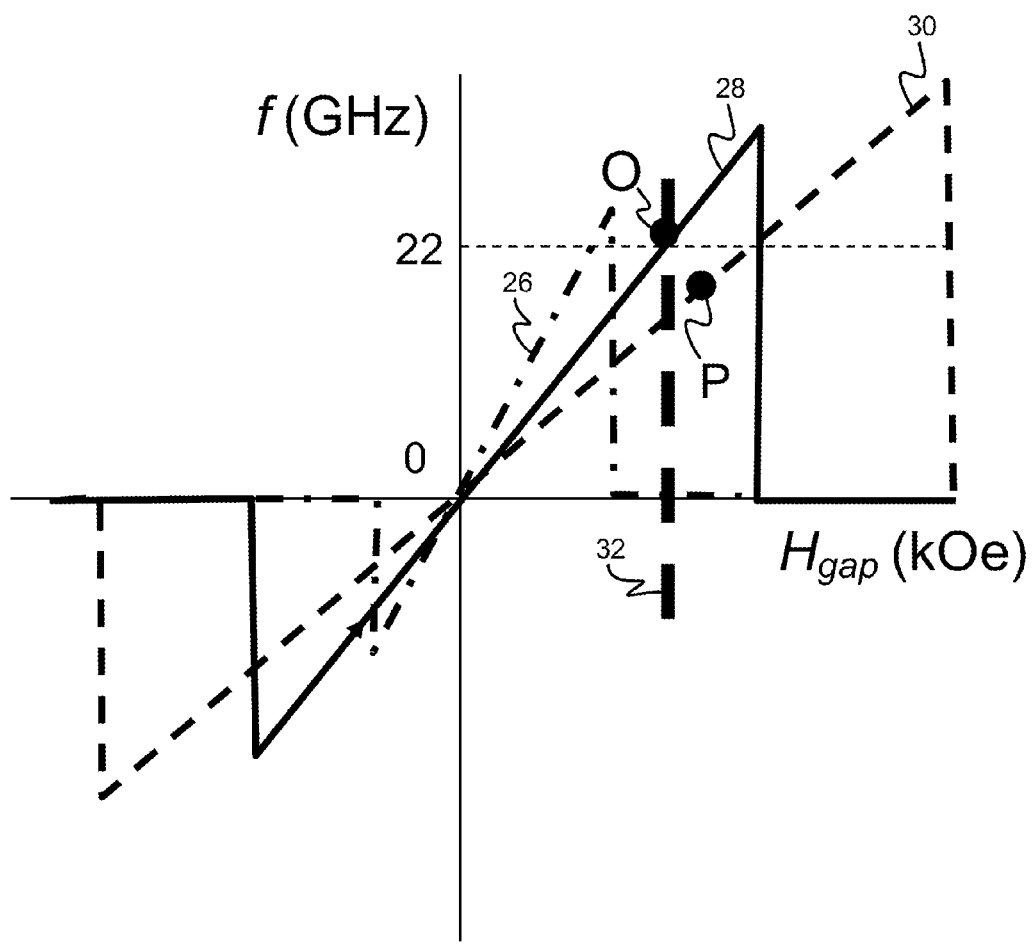
FIG. 2 is a diagram showing oscillation characteristics of a spin torque oscillator (STO), according to one embodiment.

STO oscillation characteristics are now discussed with reference to FIGS. 2-4. FIG. 2 shows an example of an applied magnetic field ($H_{gap}$) dependence of an oscillation frequency of an antiparallel-rotating spin torque oscillator (STO) determined by solving an Landau-Lifshitz-Gilbert (LLG) equation that contains a spin torque term, according to an exemplary embodiment. The magnetic field is gently increased from a state in which a strong negative magnetic field is exerted toward a positive magnetic field. While the oscillation frequency of the STO is roughly proportional to the applied magnetic field, when the magnetic field exceeds a critical value, the field generation layer (FGL) magnetization orientates completely in the direction of the magnetic field and oscillation ceases.

The STO drive current ($I_{STO}$) is shown at three different values (2 mA denoted by line 26, 4 mA denoted by line 28, and 8 mA denoted by line 30). The $I_{STO}$ dependence describes a large constant of proportionality when the $I_{STO}$ is smaller, and produces a high frequency in a low magnetic field. Incidentally, the critical value at which oscillation ceases is low, and the maximum frequency able to be produced is also low. While the constant of proportionality is small when the $I_{STO}$ is large, a high frequency is able to be produced by the application of a large magnetic field.

Point O represents a case where $I_{STO}$=4 mA, the magnetic field frequency is 22 GHz, and the write magnetic field has a strength of 4.5 kOe. Point P represents a case where $I_{STO}$=8 mA. Furthermore, vertical line 32 indicates that the write magnetic field is about 4.5 kOe.

Figure 3:
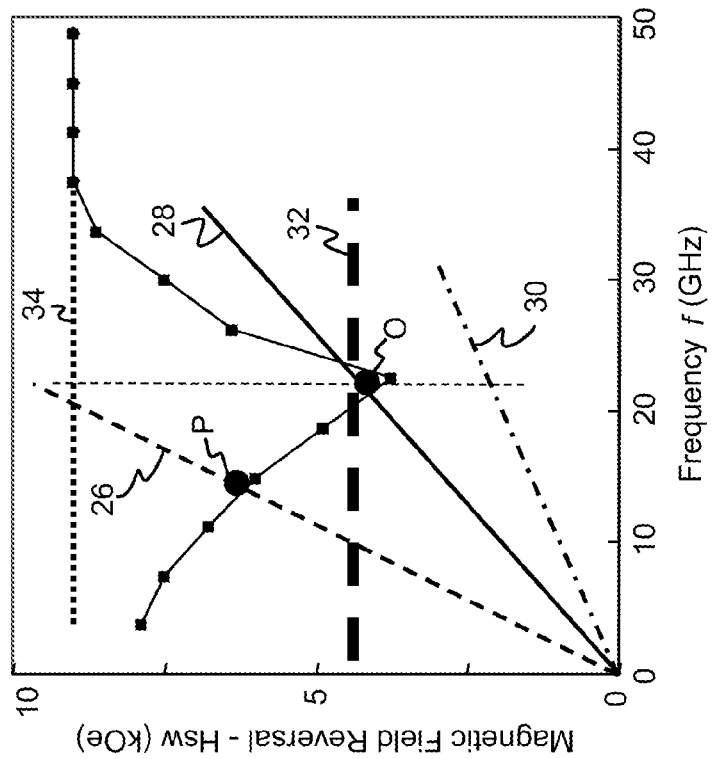
FIG. 3 is a diagram showing reverse rotation characteristics of a recording medium in MAMR, according to one embodiment.

FIG. 3 shows a plot of the magnetic field reversal frequency dependence of a recording medium determined by solving an LLG equation, according to one exemplary embodiment. The plot shows magnetic field reversal strength ($H_{sw}$) versus frequency of the magnetic field (f) for a recording medium having a magnetic coercivity of 15 kOe when the angle between the magnetic easy axis and the applied field is about 20°, at which the magnetization of media is reversed. The frequency of the magnetic field where the minimum value of the magnetic field reversal strength ($H_{sw}$) is achieved is on the order of about 22 GHz, and reversal is possible in approximately half of the magnetic field frequencies without the assistance of a microwave magnetic field. The dotted line 34 with $H_{hf}$ equal to zero indicates when the microwave-assisted effect ($H_{hf}$) provided by the microwave magnetic field is completely absent. When the frequency of the magnetic field reaches a frequency greater than an optimum value (about 22 GHz), the microwave-assisted effect ($H_{hf}$) is suddenly reduced and a resulting increase in the magnetic field reversal strength ($H_{sw}$) is observed.

Accordingly, to produce a large gain based on a microwave-assisted effect, the region of frequencies in proximity of the point O at which the assistance effect ($H_{hf}$) is at a maximum may be used, in one approach. Point O occurs at a frequency of about 22 GHz as denoted by the vertical line 34. Furthermore, at point O, the write magnetic field is about 4.5 kOe as shown by the horizontal line 32.

Here, a straight line is assumed to pass through point O and point P which may be plotted. Since a proportional relationship exists between the magnetic field strength (e.g., a write magnetic field when no microwave magnetic field is provided) applied to the recording medium and the gap magnetic field strength, and the gap magnetic field strength and the oscillation frequency are proportional, this straight line expresses the relationship between the write magnetic field strength and the frequency of the microwave magnetic field applied to the medium during recording. With the exception of the area near point O, the magnetic field reversal strength ($H_{sw}$) separates from the straight line along a distance in the magnetic field reversal axis direction thereof, wherein the microwave-assisted effect ($H_{hf}$) is thought to be produced only near point O. This state is seen in the read/write (R/W) characteristics shown in FIG. 4.

Figure 4:
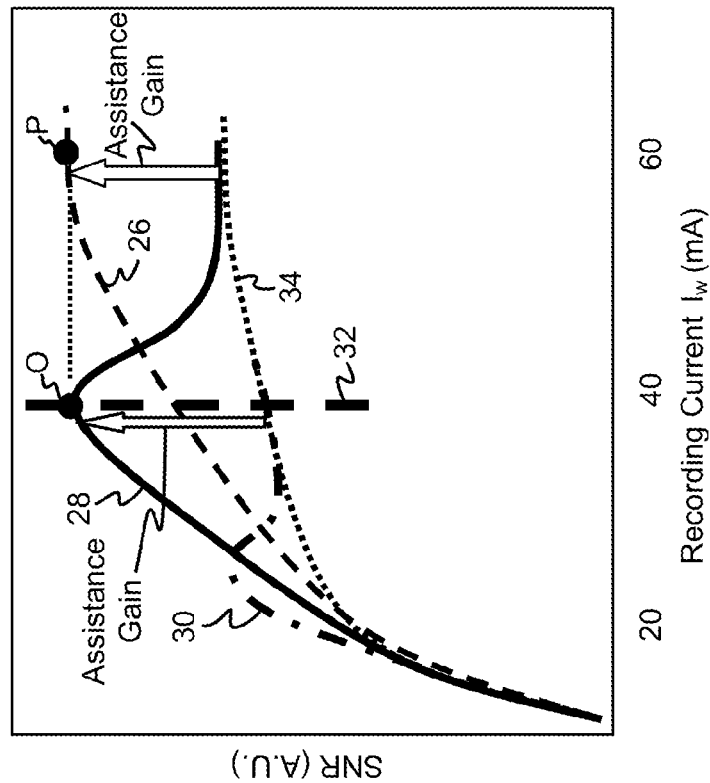
FIG. 4 is a diagram showing reading/writing characteristics, according to one embodiment.

FIG. 4 shows the signal-to-noise ratio (SNR) as a function of the write current ($I_w$). While the write current ($I_w$) and the write magnetic field are not necessarily proportional, because the magnetic pole is magnetized to generate a write magnetic field with write current ($I_w$) serving as a drive force, an increase in the write current ($I_w$) corresponds to an increase in the write magnetic field, generally. Compared to a situation where the STO current ($I_{STO}$) equals 0 in which no high-frequency magnetic field is generated, at $I_{STO}$=4 mA denoted by line 26, a large gain is produced about the region of $I_w$=40 mA, and a peak position corresponds to the point O at which the assistance effect is at a maximum.

Meanwhile, $I_{STO}$=4 mA and $I_w$=40 mA may constitute an optimum write current in one approach. The recording current of 40 mA produces a write magnetic field strength of 4.5 kOe as shown in FIG. 4 by vertical line 26. In addition, in the same way as shown in FIG. 2, the gap magnetic field ($H_{gap}$) corresponding to the write current of 40 mA is shown by vertical line 26 in FIG. 4.

When the $I_{STO}$ is excessively small (line 26 of FIGS. 2-4, $I_{STO}$=2 mA), because the oscillation frequency of the STO reaches the desired value of 22 GHz (as shown in FIG. 2) at an $I_w$ of less than 40 mA, the required magnetic field reversal strength ($H_{sw}$) cannot be supplied to the medium and, in turn, the SNR gain is very small (as shown in FIG. 4). When the $I_{STO}$ is excessively large (line 30 of FIGS. 2-4, $I_{STO}$=8 mA), the oscillation frequency of the STO at $I_w$=40 mA does not reach the desired value of 22 GHz (as shown in FIG. 2). While the $I_w$ (for the gap magnetic field) is increased in order to increase the frequency, because the write magnetic field increases simultaneously with an increase in the $I_w$, the write point is moved to point P (as shown in FIG. 3). That is to say, the $I_{STO}$ and $I_w$ must both be made greater (toward point P) than as compared to when the assistance effect is at a maximum. Incidentally, the thus-produced maximum SNR is the same or slightly higher than the SNR produced under the optimum write conditions (as denoted by line 36 of FIG. 4).

Accordingly, when altering the $I_{STO}$ and $I_w$ of the HDD in an attempt to self-learn how to determine combinations of $I_{STO}$ and $I_w$ that produce the maximum SNR, there is a high likelihood that the $I_{STO}$ will approximate its maximum settable value. The STO comprises a thin-film structure for efficiently transmitting spin torque, and overcurrent reduces the usable life thereof. For the purpose of maintaining STO characteristics and, in addition, saving power, the operations are preferably performed using $I_{STO}$ and $I_w$ values as small as possible.

Accordingly, in one embodiment, a MAMR device is provided which achieves assisted recording while minimizing $I_{STO}$ and $I_w$ values as much as possible to provide a durable apparatus capable of high-density recording.

Figure 5:
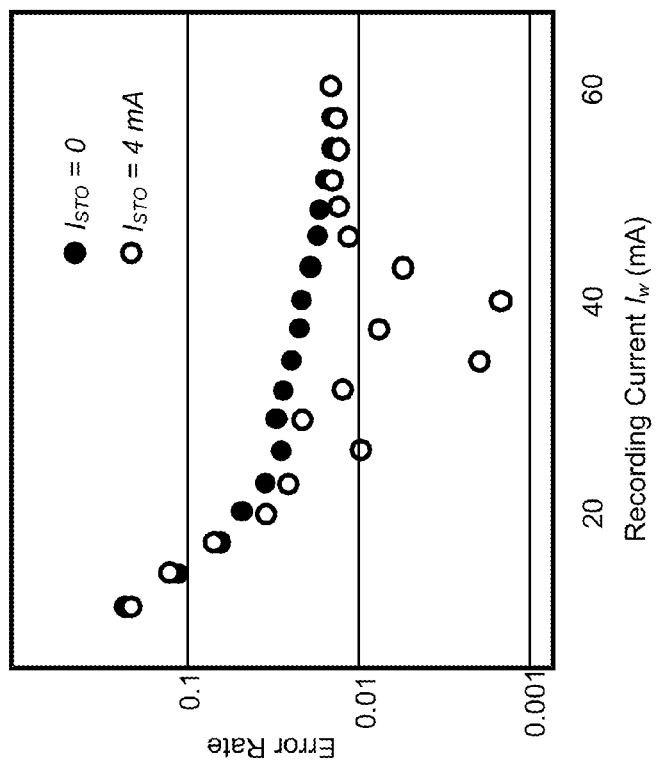
FIG. 5 is a diagram showing a recording current dependence on the leading bit error rate, according to one embodiment.

A second problem to be addressed by embodiments herein is described with reference to FIGS. 5-6. FIG. 5 expresses the write error rate of the leading bit immediately following the initiation of recording with the $I_{STO}$ and $I_w$ simultaneously set from 0 to their respective set values. While the error rate decreases accompanying an increase in the $I_w$ when $I_{STO}$ is 0, a gentle decrease in error rate occurs when $I_w$ exceeds 40 mA. The difference between when the $I_{STO}$ is 4 mA and when there is no flow of current to the STO while $I_w$ exceeds 20 mA is marked. While the largest decrease in the error rate occurs in a region near the optimum write conditions at $I_w$=40 mA, the high frequency of fluctuations that occur under these conditions renders the error rate unstable.

Figure 6:
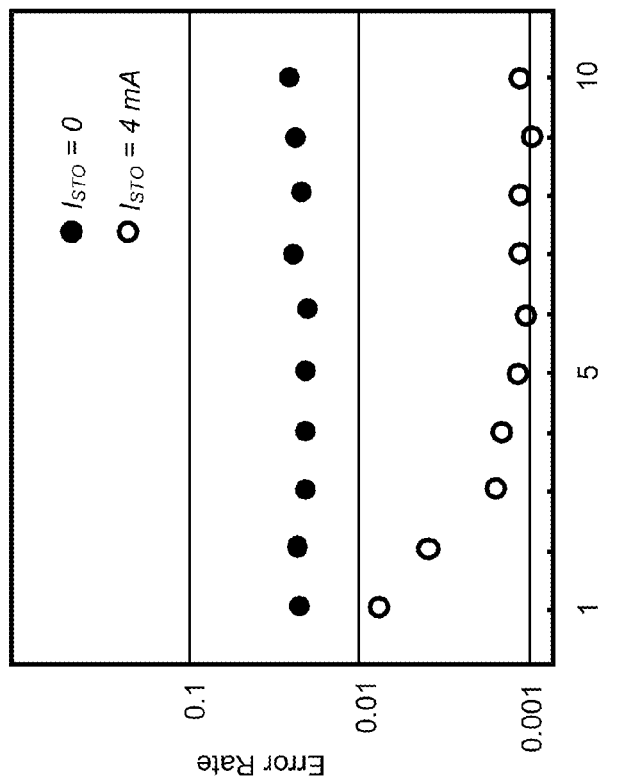
FIG. 6 is a diagram showing the error rate of N bits from the leading bit, according to one embodiment.

FIG. 6, which is used to seek the cause of these fluctuations, shows the error rate from the leading bit to an N number bit. In contrast to the negligible change in the error rate that occurs as N increases when the $I_{STO}$ is 0, the error rate decreases as N increases when the $I_{STO}$ is 4 mA, and reaches a fixed value on the order of N=5.

While this is thought to be the cause of the increase in the error rate that immediately follows the initiation of recording when the $I_{STO}$ and $I_w$ are set to set values, it is thought to decrease over time.

In another embodiment, the current may be set that eliminates the cause of the increase in the error rate that immediately follows the initiation of recording while still providing an adequate assistance effect, to provide a MAMR apparatus with improved reliability in comparison with conventional MAMR devices and in turn, costs associated with recording and retrieving information from magnetic media may be reduced.

Notably, because each of the current value, the frequency value, etc., differ according to the medium, the head, and the STO construction that are actually employed, current values and frequency values are not limited to the specific values recited in the above exemplary embodiments. Instead, the current and frequency value may be dictated by the particular arrangement of components of the MAMR apparatus and magnetic medium, with the particular relationships and optimization techniques described herein being applicable to any device, apparatus, and/or system employing MAMR technology.

It has been determined during experimentation that, in a MAMR apparatus where the optimum write current is set during self-learning based on the alteration of the STO drive current $I_{STO}$ and the write current $I_w$, as illustrated in FIG. 4, it is effective to evaluate the assistance gain as a measurement value difference with respect to the measurement value at $I_{STO}$=0. When $I_{STO}$=0, because $I_w$ is large and the write magnetic field increase ratio reduces, an increase in the recording current $I_w$ results in a continuous increase in the write magnetic field, and in a gentle increase in the SNR. On the other hand, the maximum SNR in the assistance state is essentially fixed at the optimum $I_w$ and beyond. Accordingly, when determining the assistance gain, the maximum gain is achieved at the optimum current.

Figure 7:
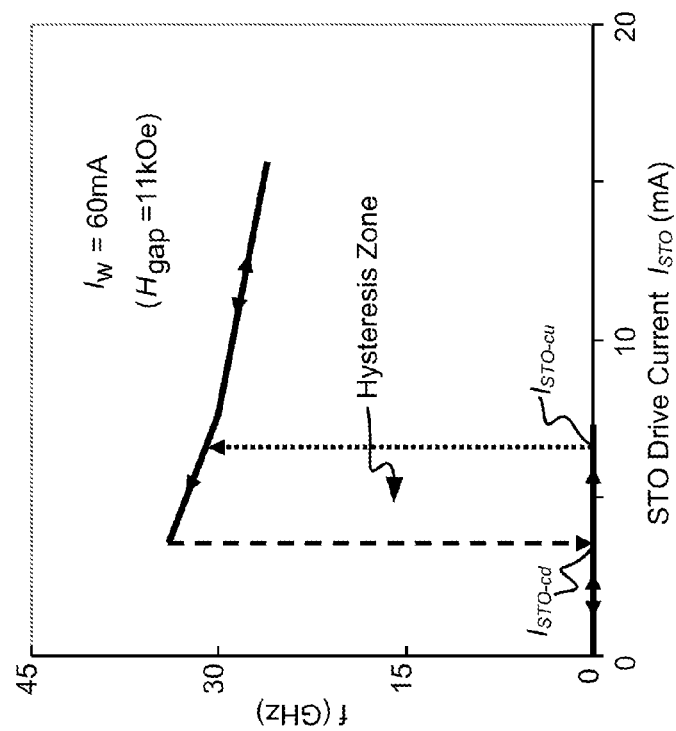
FIG. 7 is a diagram showing the hysteresis characteristics with respect to the STO drive current, according to one embodiment.

Next, for the purpose of examining the STO oscillation characteristics, simulation employing an LLG equation containing a spin torque term was carried out. FIG. 7 shows the results of an examination of the oscillation frequency of a STO when, at $I_w$=60 mA, the $I_{STO}$ was reciprocated between 0 mA and 16 mA. The current rate change was taken to be about 0.2 mA/ns.

When the $I_{STO}$ is increased from 0, oscillation does not occur until $I_{STO-cu}$. Then, when $I_{STO-cu}$ is exceeded, oscillation occurs at 30 GHz and when the $I_{STO}$ is further increased, the oscillation frequency gently decreases. When the $I_{STO}$ is decreased from 16 mA, the frequency gradually increases from approximately 27 GHz, and reaches 30 GHz at $I_{STO-cu}$. Until $I_{STO-cu}$, irrespective of an increase or a decrease in the $I_{STO}$, the oscillation frequency is uniquely determined on the basis of the $I_{STO}$ value. While the oscillation frequency continues to increase even when the $I_{STO}$ is less than the $I_{STO-cu}$ and reaches 34 GHz at $I_{STO-cd}$, oscillation ceases when the $I_{STO}$ is further decreased.

Accordingly, it is clear that the $I_{STO}$ does not possess hysteresis characteristics between the $I_{STO-cd}$ and $I_{STO-cu}$. When the current change ratio is reduced, while the $I_{STO-cu}$ increases, little change in the $I_{STO-cd}$ occurs. This hysteresis is seen in both the oscillation initiation magnetic field and oscillation stoppage magnetic field of FIG. 2. From this it may be surmised that, in the hysteresis zone, the FGL magnetization is restricted to a kind of metastable state, for lack of a better explanation.

Figure 8:
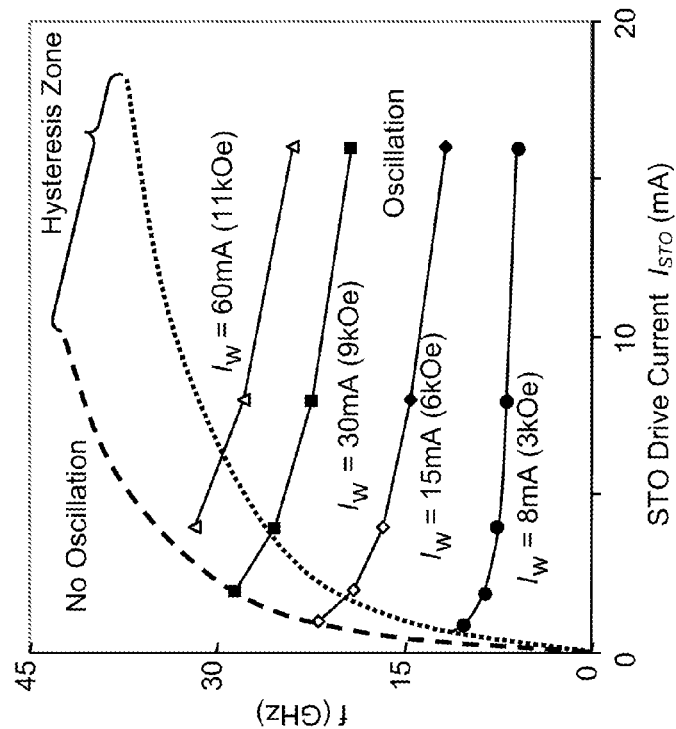
FIG. 8 is a diagram showing the hysteresis characteristics with respect to the STO drive current, according to another embodiment.

FIG. 8 shows the $I_{STO}$ dependence of the oscillation frequency in tests conducted similarly to those for FIG. 7 with respect to several $I_w$ set values. Referring again to FIG. 8, the hysteresis zone of the diagram includes a region in which, in contrast to measurement of oscillation when the STO drive current is reduced from a large $I_{STO}$ value, oscillation cannot be measured even when the STO drive current is increased from a region of no oscillation.

Figure 9:
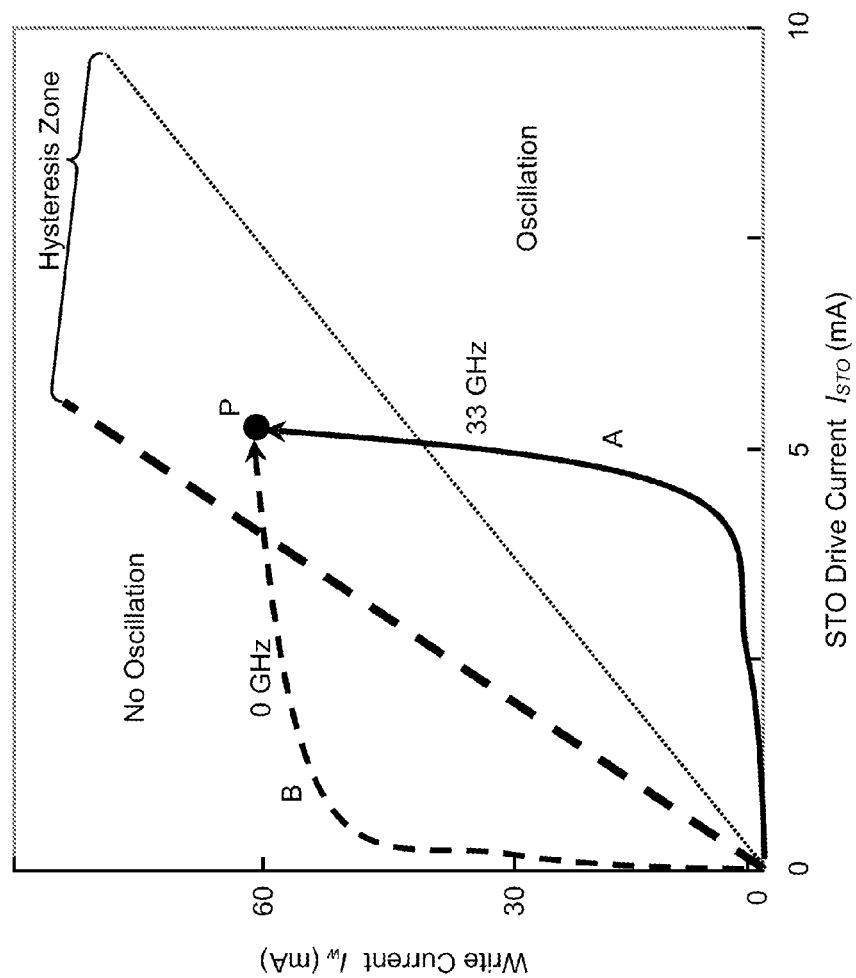
FIG. 9 is a diagram showing the STO hysteresis characteristics, according to one embodiment.

FIG. 9 shows the region expressed as the hysteresis zone in FIG. 8 as an $I_{STO}$ and $I_w$ diagram. For example, as shown in FIG. 9, because route 38 passes through the oscillation region, a 33 GHz oscillation is produced until the point P (where $I_{STO}$=2 mA and $I_w$=60 mA) is reached. In contrast, because route 40 passes through the non-oscillation region, there is no oscillation even when point P is reached.

Based on this observation, it may be determined that, after the STO drive current $I_{STO}$ has been sufficiently increased when the recording operation is initiated, the write operation may be promptly implemented by ramping up the write current.

Figure 10:
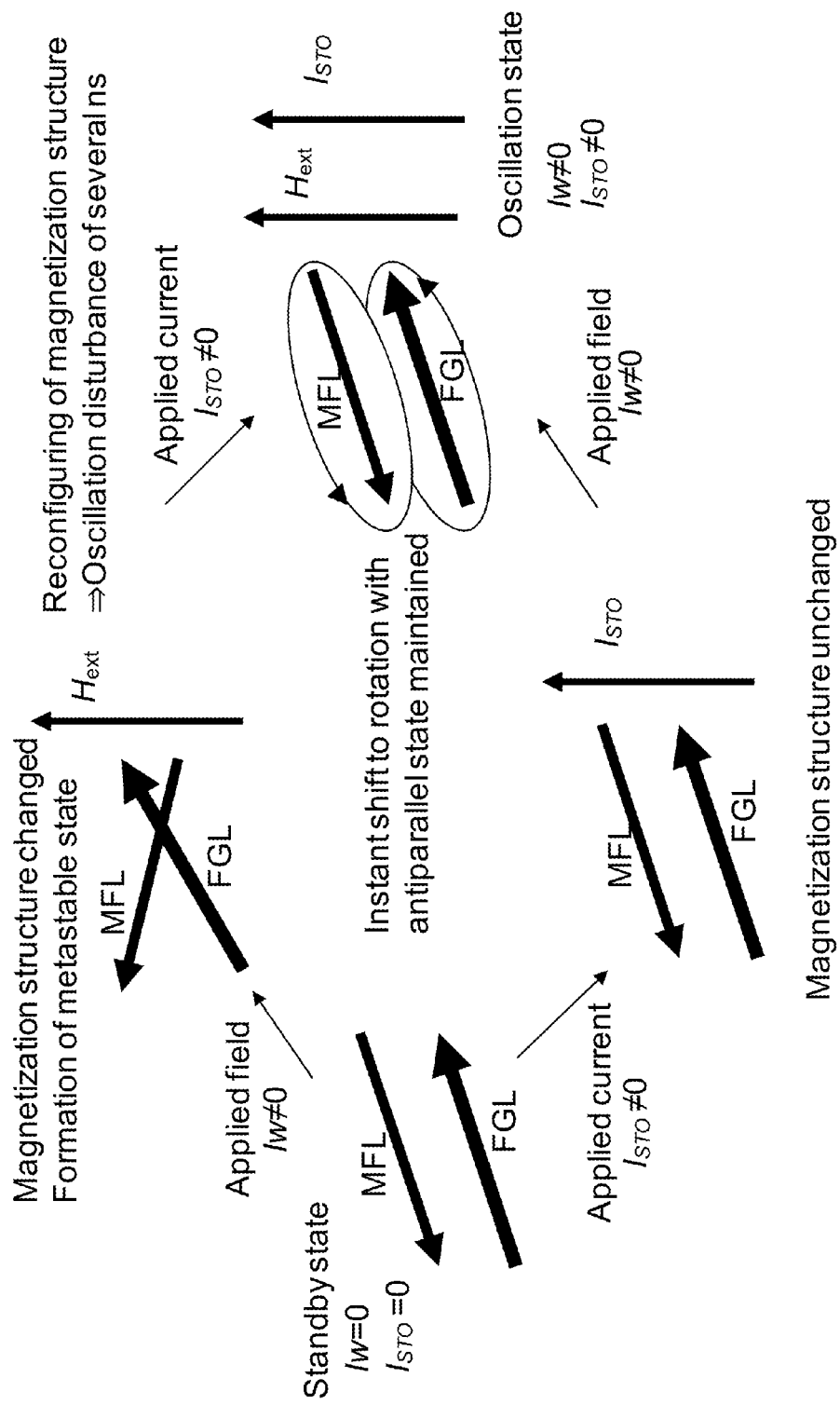
FIG. 10 is a diagram of the STO hysteresis characteristics mechanism, according to one embodiment.

While the system for setting the current according to one embodiment is also effective in conventional STOs that comprise a pinned layer, it affords a particularly significant effect in antiparallel-type STOs in which there is no pinned layer. The STO oscillation lag phenomenon which allows for the advancements described herein, along with the measures for dealing with the same, are now described with reference to FIG. 10.

In an antiparallel-type STO, FGL magnetization and magnetic flux leakage (MFL) magnetization lie in an antiparallel state in the standby state (with $I_{STO}$=0 and $I_w$=0). Initially, when the STO drive current $I_{STO}$ is ramped up, the spin torque produces an action that establishes the antiparallel nature of the two magnetizations, and the magnetization structure does not differ from its structure in the standby state. Upon continuous ramping up of the write current, a shift to an oscillation (rotating) state while maintaining the antiparallel state occurs.

In contrast, when the write current $I_w$ is initially ramped up, the FGL magnetization and MFL magnetization are inclined in the direction of the magnetic field captured in a metastable state. Even if the STO drive current $I_{STO}$ is continuously ramped up, it takes time to escape from the metastable state and to reach a stable magnetization rotation plane.

Based on this observation, it may be determined that, after the STO drive current $I_{STO}$ has been sufficiently increased when the recording operation is initiated, the write operation may be promptly implemented by ramping up the write current. It may be similarly determined that, after the STO drive current $I_{STO}$ has been sufficiently reduced when the recording operation is initiated, the write operation may again be promptly implemented when a recording operation is being performed by ramping up the STO drive current $I_{STO}$.

By using a MAMR-HDD to perform the drive current ramping as described herein according to various embodiments, the STO drive current $I_{STO}$ and write current $I_w$ may be set to optimum conditions and, furthermore, the STO may be reliably oscillated immediately following the initiation of recording and, as a result, an adequate assistance effect may be produced. This facilitates the provision of a STO drive method and a magnetic recording device having high reliability and durability and, as a result, reduced costs are achieved which render the device ideal for use in super high-density MAMR applications.

Figure 11:
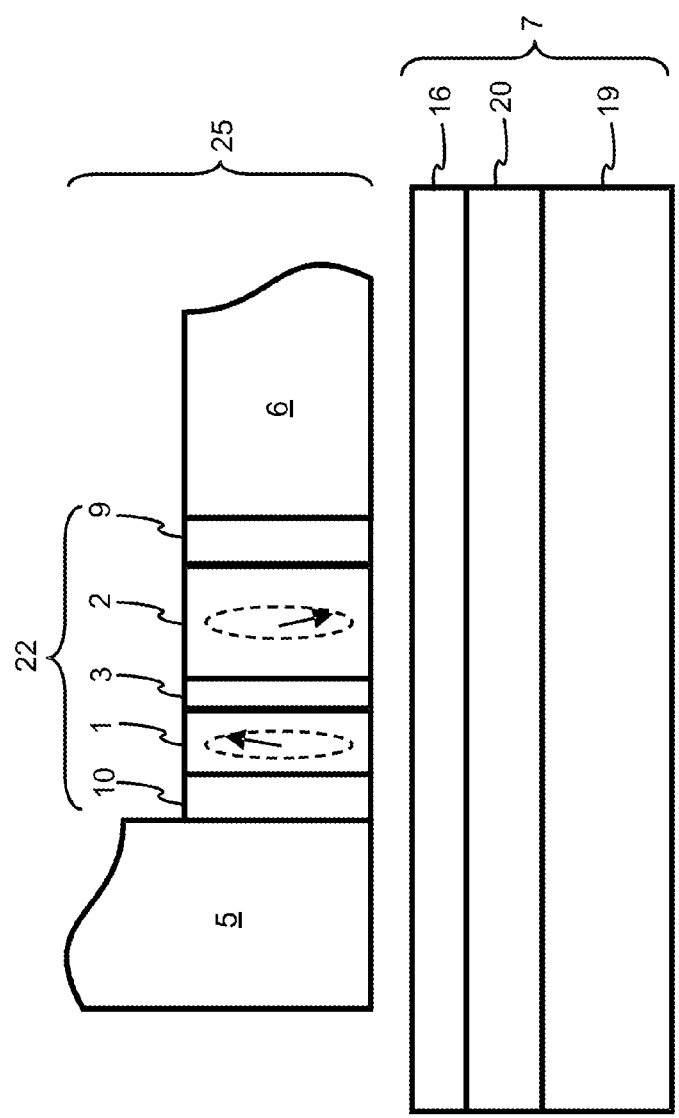
FIG. 11 is a schematic cross-sectional view of one working example of the magnetic recording head, according to one embodiment.

Embodiments are now described in detail with reference to specific working examples thereof. FIG. 11 is a cross-sectional schematic diagram of one working example of the magnetic recording head according to one embodiment across a plane perpendicular to the plane of the recording medium (vertical direction in the figure) and parallel to the direction of movement of the head (track direction which is left to right in the figure). The diagram also shows a cross-section of the medium.

A recording head 25 comprises magnetic circuits between a main pole 5 and a trailing shield 6 which is configured to act as a return pole, according to one embodiment. Incidentally, this upper portion of the recording head 25 is in an essentially electrically insulated state. In the magnetic circuit, the lines of magnetic force form a closed circuit, and there is no need for the formation of the magnetic circuit from a magnetic body alone. In addition, the magnetic circuit may be formed by the arrangement of an auxiliary magnetic pole, or the like, for the main pole 5 on the opposing side of the STO 22 to the trailing shield 6 side of the STO 22. Furthermore, the magnetic recording head 25 is provided with a coil, wire such as copper wire, etc., for exciting these magnetic circuits. An STO 22 is formed between the main pole 5 and the trailing shield 6. A connection (not shown) for establishing pole-pole electrical contact is provided in the main pole 5 and the trailing shield 6. This is configured in such a way that an STO drive current flows from the main pole 5 side of the STO 22 to the trailing shield 6 side of the STO 22, or in the reverse direction across the STO 22. As the main pole 5 and trailing shield 6 material, a CoFe alloy may be used. In one such embodiment, a CoFe alloy having a high saturation magnetization (e.g., more than about 2.0 T in some approaches) and substantially no crystal magnetic anisotropy (e.g., less than about 50 Oe in some approaches) may be used.

For the recording medium 7, in one embodiment, a laminated film may be used in which a 10 nm-Ru layer is fabricated above or directly on a 30 nm-CoFe as a base layer 20 and a laminated film in which a 4 nm-CoCrPt—$SiO_x$ layer (magnetic anisotropy magnetic field of 1.6 MA/m (20 kOe)) is fabricated on a 6 nm-CoCrPt—$SiO_x$ layer (magnetic anisotropy magnetic field of 2.4 MA/m (30 kOe)) as a recording layer 16 may be employed on a substrate 19.

The STO 22 may be formed from a non-magnetized spin scattering layer 10, a first FGL 1, a non-magnetized spin transfer layer 3, a second FGL 2, and a second non-magnetized spin scattering layer 9 as a laminated structure between the main pole 5 and the trailing shield 6. Notably, the cross-section of this columnar structure extending in the horizontal direction in the figure from the non-magnetized spin scattering layer 10 to the second non-magnetized spin scattering layer 9 describes a long rectangular shape in the direction along the media-facing or air bearing surface (ABS) plane. Because the use of this long rectangular shape generates a shape anisotropy in the track width direction, even in the presence of an in-plane component of the first FGL 1 and/or the second FGL 2 in a lag magnetic field from the main pole 5, in-plane magnetization rotation of the first FGL 1 and/or the second FGL 2 is able to be smoothly implemented, and the main pole 5 and the first FGL 1 are able to be brought into proximity. Incidentally, when the lag magnetic field from the main pole 5 is negligible, this cross-sectional shape may more closely resemble a square shape.

The length (w) of these cross-sectional shapes along the edge of the ABS plane is a major contributing factor in determining the recording track width and, in this working example, this length may be from about 20 nm to about 60 nm, such as about 40 nm. In MAMR, a recording medium with a large magnetic anisotropy that does not allow recording to be performed when the recording magnetic field from the main pole 5 fails to match the high-frequency magnetic field from the first FGL 1 and the second FGL 2 is employed and, for this purpose, the width and the thickness (length in direction in which the head moves) of the main pole 5 are set larger and in a way that ensures a larger recording magnetic field. In this working example, a width of about 80 nm and a thickness of about 100 nm produce a recording magnetic field of approximately 0.9 MA/m. Of course, other dimensions may be used, which produce a different recording magnetic field.

In one embodiment, a 3 nm-$(Co/Ni)_n$ multi-layered film may be used as the first FGL 1. Because the length from the end face of the main pole 5 to the end face of the trailing shield 6 is about 21 nm in this example, and the height of the first FGL 1 is about 38 nm, the magnetic field applied to the STO 22 in this working example as found through analysis performed employing 3D-magnetic field software analysis is approximately 1.0 MA/m (12 kOe). As the second FGL 2, a 10 nm thick (in the track direction) CoFe alloy may be used, with the CoFe alloy possibly having a large saturation magnetization and essentially no crystal magnetic anisotropy. The first FGL 1 magnetization and the second FGL 2 magnetization are essentially antiparallel and rotate at high speed along the lamination, and the lag magnetic field from the main pole 5 that appears along the ABS plane and the side plane acts on the recording medium 7 as a high-frequency magnetic field. As the first FGL 1 and/or the second FGL 2, a $(CoFe)_n$ multi-layered film may be used, with n denoting the number of layers of CoFe. The $(CoFe)_n$ multi-layered film may, in one approach, have a large saturation magnetization and a negative perpendicular magnetic anisotropy. In this case, the FGL magnetization in-plane rotation is stabilized.

In the STO 22 of this working example, a stable and roughly antiparallel magnetization state is formed. This magnetization state may be formed by the flow of current from the second FGL 2 side of the STO 22 (where a large Ms×t—product of the magnetization and thickness—is larger than the product of Ms×t for the first FGL 1) to the first FGL 1 side of the STO 22. As shown in FIG. 11, when the second FGL 2 having large Ms×t is positioned on the trailing shield 6 side, the STO drive current flows from the current trailing shield 6 side to the main pole 5 side of the STO 22. The larger the STO drive current, the greater the spin torque action. In addition, the spin torque action is greater when about 1 nm, or more or less, of Co is inserted between the non-magnetized spin transfer layer 3 and a layer adjacent thereto, such as the first FGL 1 and/or the second FGL 2. The Co may have a large polarization (e.g., more than about 0.5 in some approaches) in order to increase the spin torque action, according to one embodiment.

In one embodiment, Cu may be employed as a non-magnetized spin transfer layer 3 or some other suitable material known in the art, having a suitable thickness, such as a thickness in a range from about 1 nm to about 5 nm, such as about 2 nm. According to another embodiment, Ru or some other suitable material known in the art, such as Pd, Pt, etc., may be used as the non-magnetized spin scattering layers 8 and 9. Each of these layers may have a thickness suitable for spin scattering, such as about 3 nm, or in a range from about 1 nm to about 6 nm, in various embodiments. The scattering of spin information produced by the non-magnetized spin scattering layers 8 and 9 prevents the generation of interaction by way of the spin torque between the STO 22 and the main pole 5 and/or trailing shield 6. In the absence of the non-magnetized spin scattering layers 8, 9, STO oscillation may be unstable, which is undesirable.

In one embodiment, a MAMR head may comprise a main pole configured to write data to a magnetic medium using a write magnetic field, a write coil, wherein the write magnetic field is produced by the main pole upon a recording current, $I_w$, being provided to the write coil, and a STO or some other high-frequency magnetic field generating device positioned near the main pole, the STO being configured to provide a high-frequency assistance magnetic field to the magnetic medium upon a STO drive current, $I_{STO}$, being provided to the STO. The STO drive current, $I_{STO}$, is ramped-up prior to the recording current, $I_w$, being provided to the write coil in order to begin a write operation for writing data to the magnetic medium.

Furthermore, in some approaches, the recording current, $I_w$, may be ramped-down prior to the STO drive current, $I_{STO}$, being reduced in order to cease the write operation for writing data to the magnetic medium.

In some embodiments, a magnetic data storage system may comprise at least one MAMR head as described above, the magnetic medium, a drive mechanism for passing the magnetic medium over the at least one MAMR head, and a controller electrically coupled to the at least one MAMR head for controlling operation of the at least one MAMR head.

In these embodiments, the controller may be further configured to perform any of the following functions: determine optimum recording conditions for the MAMR head and magnetic medium based on alteration of $I_{STO}$ and $I_w$ via writing to the magnetic medium and subsequent reading from the magnetic medium of a predetermined test signal; change the $I_{STO}$ from a larger value to a smaller value with respect to an $I_w$ set value, and/or to change the $I_{STO}$ from a smaller value to a larger value with respect to the $I_w$ set value, to determine optimum recording conditions; ensure that a time delay is provided for altering the $I_w$ set value at an $I_{STO}$ maximum value; change the $I_w$ from a larger value to a smaller value with respect to an $I_{STO}$ set value, and/or to change the $I_w$ from a smaller value to a larger value with respect to the $I_{STO}$ set value to determine optimum recording conditions; ensure that a time delay is provided for altering the $I_{STO}$ set value at an $I_w$ minimum value; ensure that at the determined optimum recording conditions, substantially no STO oscillation occurs; create and store a parameter control table which describes a STO non-oscillation region corresponding to a combination of values of $I_w$ and $I_{STO}$ for which, compared to use of a recording current alone, no gain is able to be produced; and/or determine optimum recording conditions based on a comparison with a measurement value of $I_{STO}=0$.

The magnetic data storage system may include components as shown in FIGS. 23A-23B, in one approach.

Figure 12:
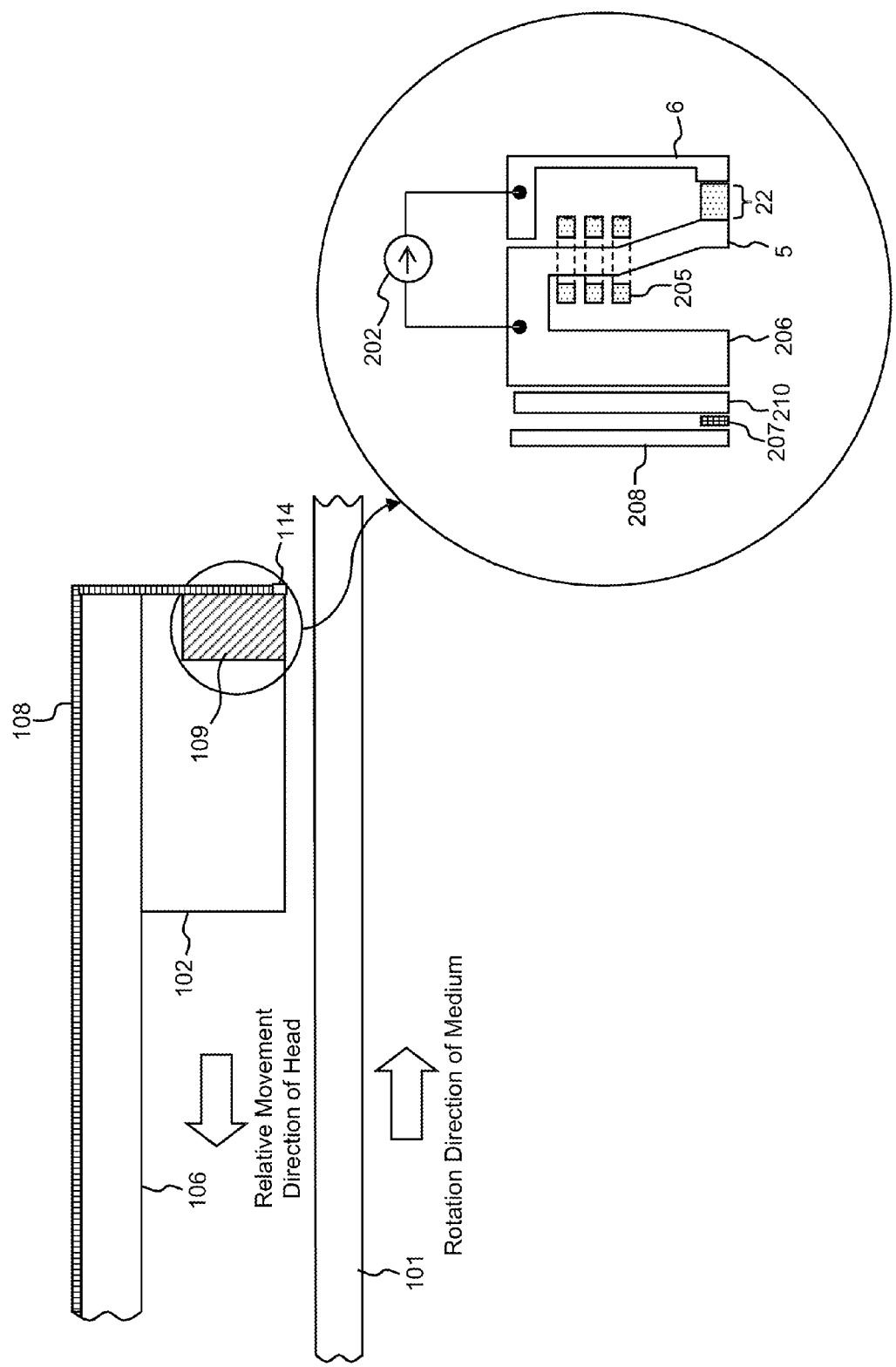
FIG. 12 is an expanded cross-sectional view of a slider and a reading/writing portion mounted thereon, according to one embodiment.

As shown in the schematic diagram of FIG. 12, a magnetic head slider 102 mounted on a read/write portion 109 in which the STO 22 has been assembled and affixed to a suspension 106 was examined employing a spin stand, to determine the reading/writing characteristics of the device. The read/write portion 109 comprised a write head portion and a read head portion. As shown in the expanded view, the write head portion comprises, among other components, an auxiliary magnetic pole 206, the STO 22 arranged between the main pole 5 and the trailing shield 6, and a coil 205 for exciting the main pole 5. The read head portion comprises, among other components, a reproduction sensor 207 arranged between a lower shield 208 and an upper shield 210. The joint use of the auxiliary magnetic pole 206 as the upper shield 210 is possible, as well as using an opposite pole instead of or in addition to the trailing shield 6. The drive current for the various constituent components of the read/write portion 109 is fed by way of a wire 108, and is supplied by a terminal 114 to the various constituent components. While the expanded view schematically shows an STO drive current 202 that flows as the current to the STO 22, in reality, the STO drive current 202 is arranged on the exterior of a slider 102, and the STO drive current is supplied to the STO 22 by way of a wiring 108 to the STO drive current 202.

Figure 13:
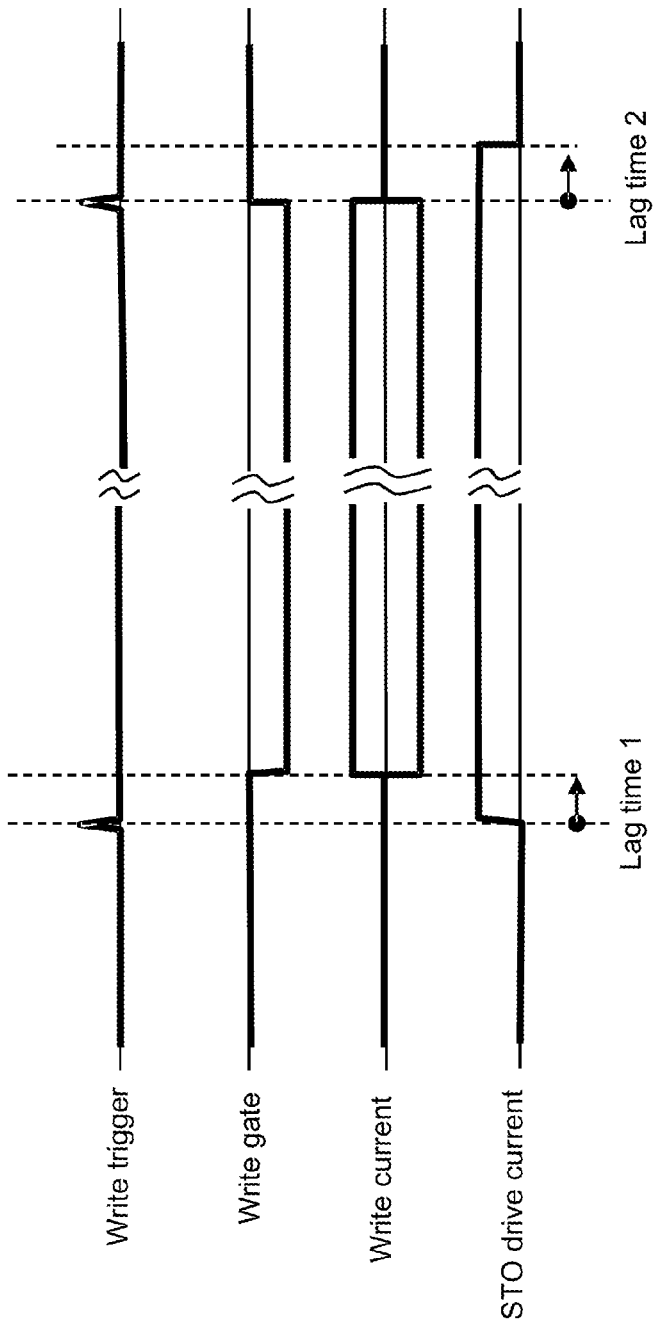
FIG. 13 is a diagram showing the STO drive current and recording current timing, according to one embodiment.

The opening and/or closing of the write gate and the STO drive current at the initiation and stoppage of the drive current recording operation is now described using the timing chart of FIG. 13, in accordance with one embodiment. When the write operation is initiated, a write trigger is used to initially ramp up the STO drive current. A slight lag (lag time 1) occurs prior to the write gate opening and the write operation beginning. Ideally, the lag time 1 is longer than the time for the STO drive current to reach 90% of its set value. When the recording operation is stopped, a write trigger is used to initially close the write gate. A slight lag (lag time 2) occurs before the STO drive current is completely stopped. Ideally, the lag time 2 is longer than a time corresponding to about 10% or less of the gap magnetic field during writing.

Figure 14:
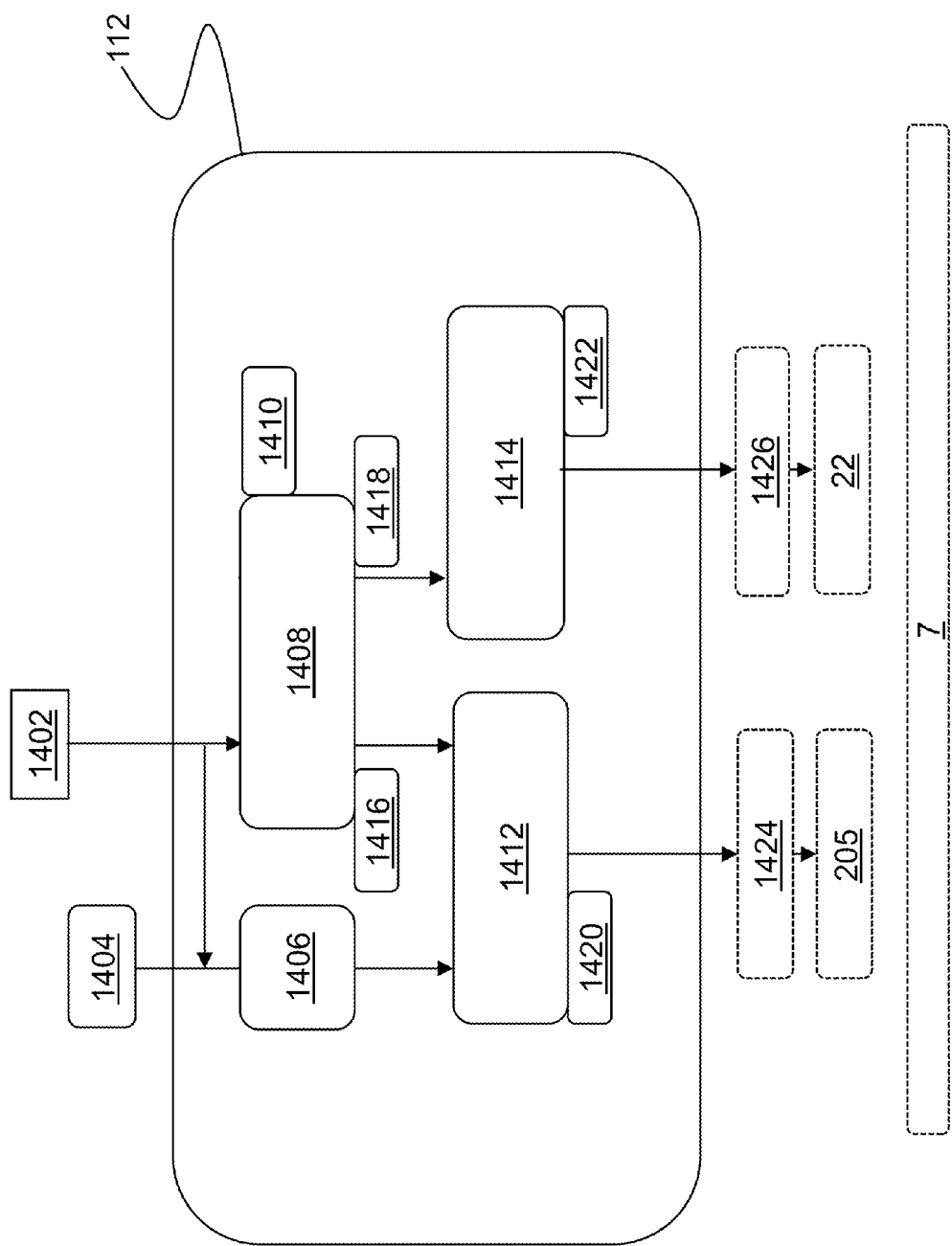
FIG. 14 is a block diagram of a circuit, according to one embodiment.

The opening and/or closing operation of the write gate and the STO drive current at the initiation and stoppage of the drive current recording operation in an exemplary integrated circuit (IC) 112 and represented by the timing chart of FIG. 13 is now described with reference to FIG. 14, in accordance with one embodiment.

When the write operation is initiated, a write trigger (write command) 1402 is input into the timing control circuit 1408 of the read/write channel IC 112. In addition, an information string 1404 to be simultaneously recorded is fed into a recording equalizer 1406 and, furthermore, is input into a recording current control circuit 1412 where the write initiation timing is awaited according to a wait time stored in a wait time memory 1410. The timing control circuit 1408 immediately issues a current ramp-up (STO gate opening) instruction (trigger) to the STO drive current control circuit 1414 and, after a first lag time (lag time 1), issues a recording initiation (write gate opening) instruction (trigger) to the recording current control circuit 1412. The STO drive current control circuit 1414, upon receipt of this current ramp-up instruction, sends a current value (DC) taken from a current value second memory 1422 to the STO drive circuit 1426. In accordance with the recording equalized recording information string 1404, the recording current control circuit 1412, upon receipt of this recording initiation instruction, forms a recording current waveform of an amplitude equivalent to the current value of a current value first memory 1420, and sends this to the recording current circuit 1424. While a lag time 1 on the order of 1 ns is normally sufficient in consideration of the transfer characteristics from the timing control circuit 1408 to the STO 22, the lag time 1 is preferably determined by a measurement based on alteration of the lag time 1 so that the error rate of the leading bit is on the order of that of the trailing bits, in one approach.

The value of the lag time 1 may be stored in a first memory 1416 ancillary to the timing control circuit 1408. The values of current value first memory 1420 and the current value second memory 1422 may be maintained as optimum values by the self-learning mechanism described later in the specification.

When the recording operation is stopped, the write trigger (write stoppage command) is input into the timing control circuit 1408. The timing control circuit 1408 immediately issues a recording stoppage (write gate closing) instruction (trigger) to the recording current control circuit 1412 and, after a second lag time (lag time 2), issues a current ramp-down (STO gate closing) instruction (trigger) to the STO drive circuit 1426. While a lag time 2 on the order of 2 ns is normally sufficient when considering the time until stabilization of the write magnetic pole magnetization state following stoppage of the recording current, a write start instruction is issued immediately after the STO gate has closed, and the lag time 2 is preferably determined by a measurement based on alteration of the lag time 2 so that the error rate of the leading bit is on the order of that of the trailing bits, in one approach. The value of the lag time 2 may be stored in a second memory 1418 ancillary to the timing control circuit 1408.

In accordance with one example, in a magnetic recording device employing a STO, optimum recording conditions including the setting of recording parameters and so on are self-learned.

Figure 15:
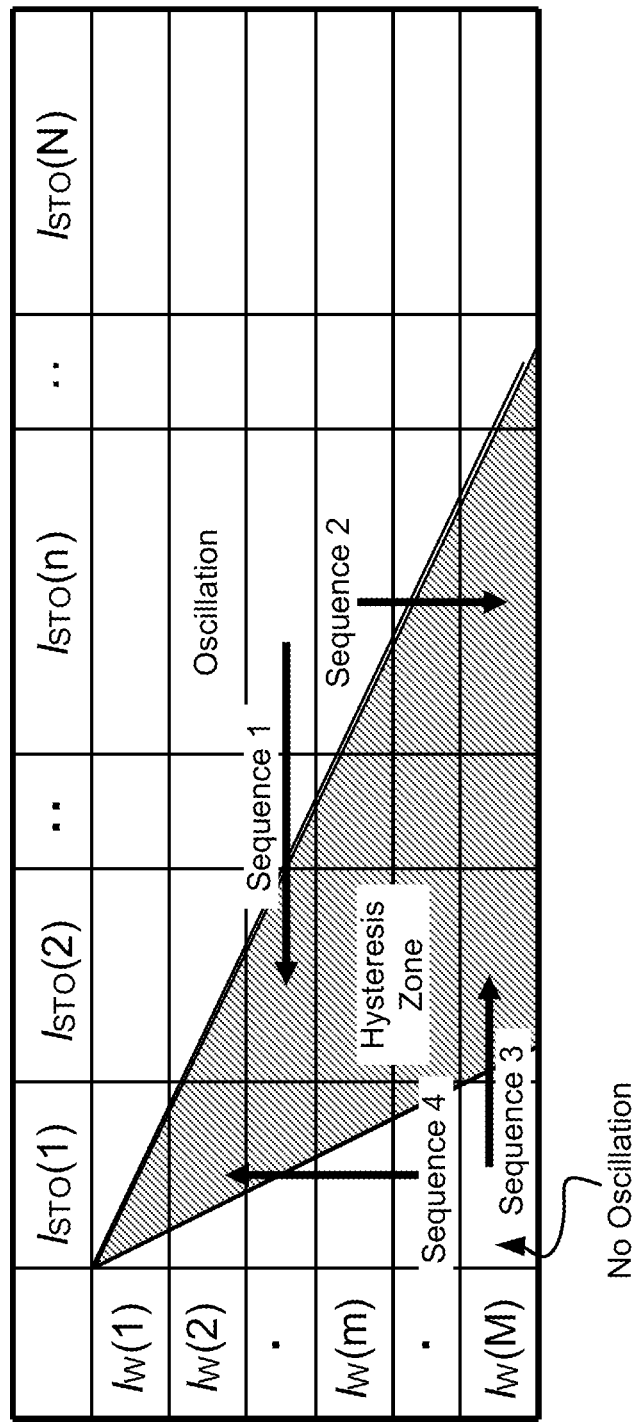
FIG. 15 is a diagram of the STO drive current and recording current matrix during self-learning, according to one embodiment.

In accordance with this example, FIG. 15 shows a matrix of the set values of the STO drive current $I_{STO}$ and the recording current $I_w$ in self-learning, wherein the larger the n and m of the $I_{STO}(n)$ and $I_w(m)$ respectively, the greater the current value that is set. For example, $I_w(m)<I_w(m+1)$ with m=1, 2, ..., M, and $I_{STO}(n)<I_{STO}(n+1)$ with n=1, 2, ..., N. In addition, the arrows in the diagram indicate the setting sequence. Referring to the oscillation characteristics of FIG. 8, there is no oscillation produced under conditions in which the $I_{STO}$ is low and the Iw is large. Accordingly, it is assumed that the hysteresis zone will appear in the shaded region of FIG. 15.

In order to oscillate the STO and implement writing in the hysteresis zone, the set sequence is shifted in the manner of sequence 1 and sequence 2 from the oscillation region to the hysteresis zone. When a shift from the oscillation region to the hysteresis zone is performed in the manner of sequence 3 and sequence 4, oscillation becomes problematic and, accordingly, the write characteristics cannot be measured. Furthermore, when the set values of the matrix are altered, following conditions at which oscillation ceases, it is preferable to wait for the oscillation state which corresponds to the conditions for oscillation to be normally restored according to various embodiments.

Figure 16:
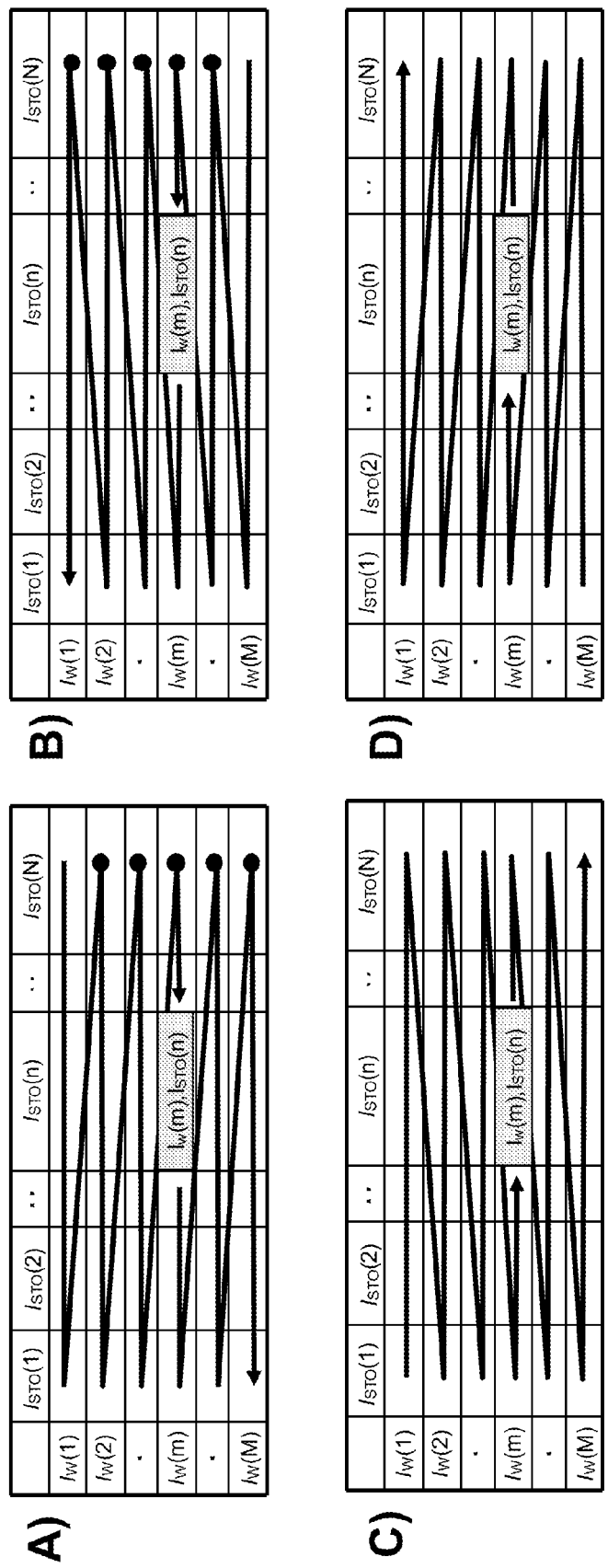
FIG. 16 is a diagram showing a sequence for writing the STO drive current and recording current along all sides of a matrix, according to one embodiment.

FIG. 16 shows the sequence in which $I_{STO}$ and $I_w$ set values are written along all sides of the matrix during self-learning. Incidentally, nothing is written on the diagonal lines. In the case of the plots shown in A) and B), the $I_w$ values are fixed and the $I_{STO}$ is decreased from a maximum set value, wherein oscillation of the STO and measurement of the write characteristics in the hysteresis zone may be expected. Furthermore, when an $I_w$ value is to be switched, a pause is preferably provided at the maximum set value of the $I_{STO}$ to allow for writing should oscillation stop. On the other hand, in the case of the plots shown in C) and D), the $I_w$ values are fixed and the $I_{STO}$ is increased from a minimum set value, and oscillation of the STO in the hysteresis zone becomes problematic and undesirable.

Figure 17:
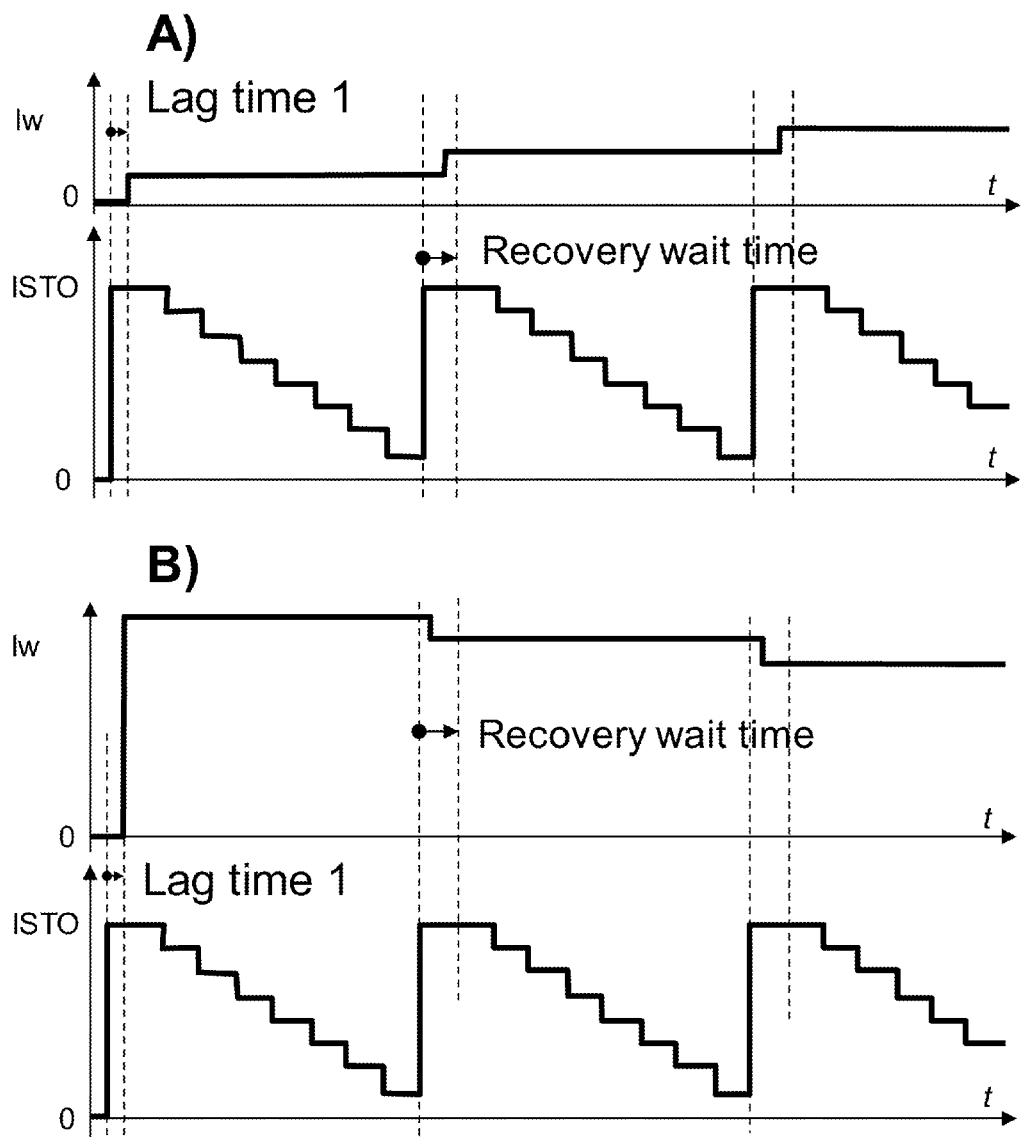
FIG. 17 is a diagram of the STO drive current and recording current timing, according to one embodiment.

FIG. 17 shows an example of the timing charts of $I_w$ and $I_{STO}$ as shown in plots A) and B) of FIG. 16. Referring again to FIG. 17, when the $I_w$ and $I_{STO}$ are set in the initial writing of the series of matrices, the $I_{STO}$ is set first, and the $I_w$ is set following the lag time 1. Because the conditions in the non-oscillation region comprise a large $I_w$ and a small $I_{STO}$, when a test writing in which the $I_{STO}$ is reduced in a step-wise or a continuous manner is performed, there is an increasing likelihood that oscillation will cease at the smallest set value of the $I_{STO}$. Thereupon, when an $I_w$ set value is to be altered, a recovery wait time for restoration of the $I_{STO}$ to its maximum value is required. The lower the $I_w$ and the greater the $I_{STO}$, the stronger the oscillation recovery from stoppage, and a lengthening of the time in which the $I_w$ is small is preferable when $I_w$ switching is performed within the recovery wait time. The recovery wait time of the circuit of FIG. 14 is set with reference to the recovery wait time memory ancillary to the timing control circuit. A recovery wait time of the order of 2-3 ns is suitable in some approaches.

Figure 18:
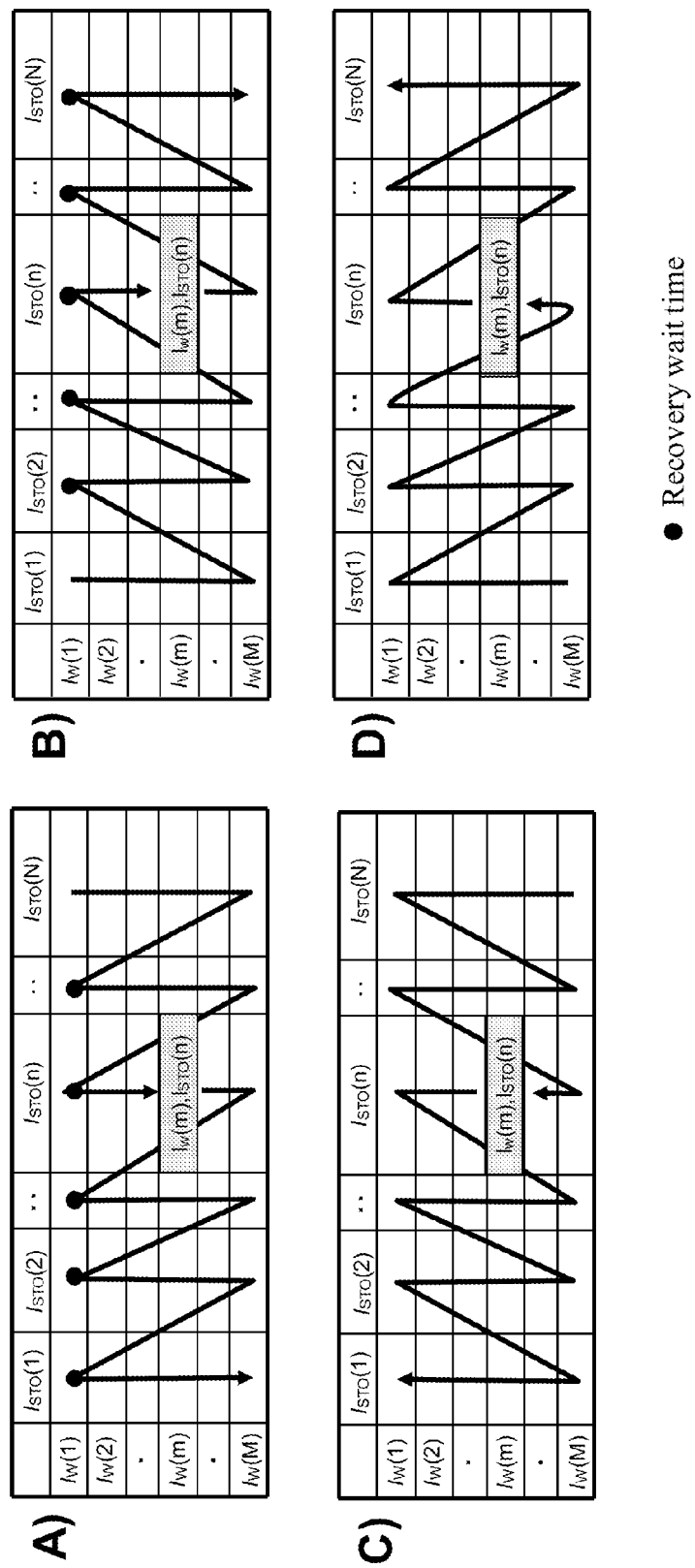
FIG. 18 is a diagram showing the sequence for writing the STO drive current and recording current along all sides of a matrix, according to one embodiment.

FIG. 18 shows the sequence in which $I_{STO}$ and $I_w$ set values are written along all sides of the matrix during self-learning. Incidentally, nothing is written on the diagonal lines. In the case of the plots in A) and B), the $I_{STO}$ value is fixed and the $I_w$ is increased from its minimum set value, wherein oscillation of the STO and measurement of the write characteristics in the hysteresis zone may be expected. Furthermore, when the $I_{STO}$ value is to be switched, a pause is preferably provided at the $I_w$ minimum set value to allow for writing to be properly performed even if oscillation were to be stopped at the previous set value. On the other hand, in the case of the plots shown in C) and D), the $I_{STO}$ value is fixed and the $I_w$ is decreased from its maximum setting, and oscillation of the STO in the hysteresis zone becomes problematic.

Figure 19:
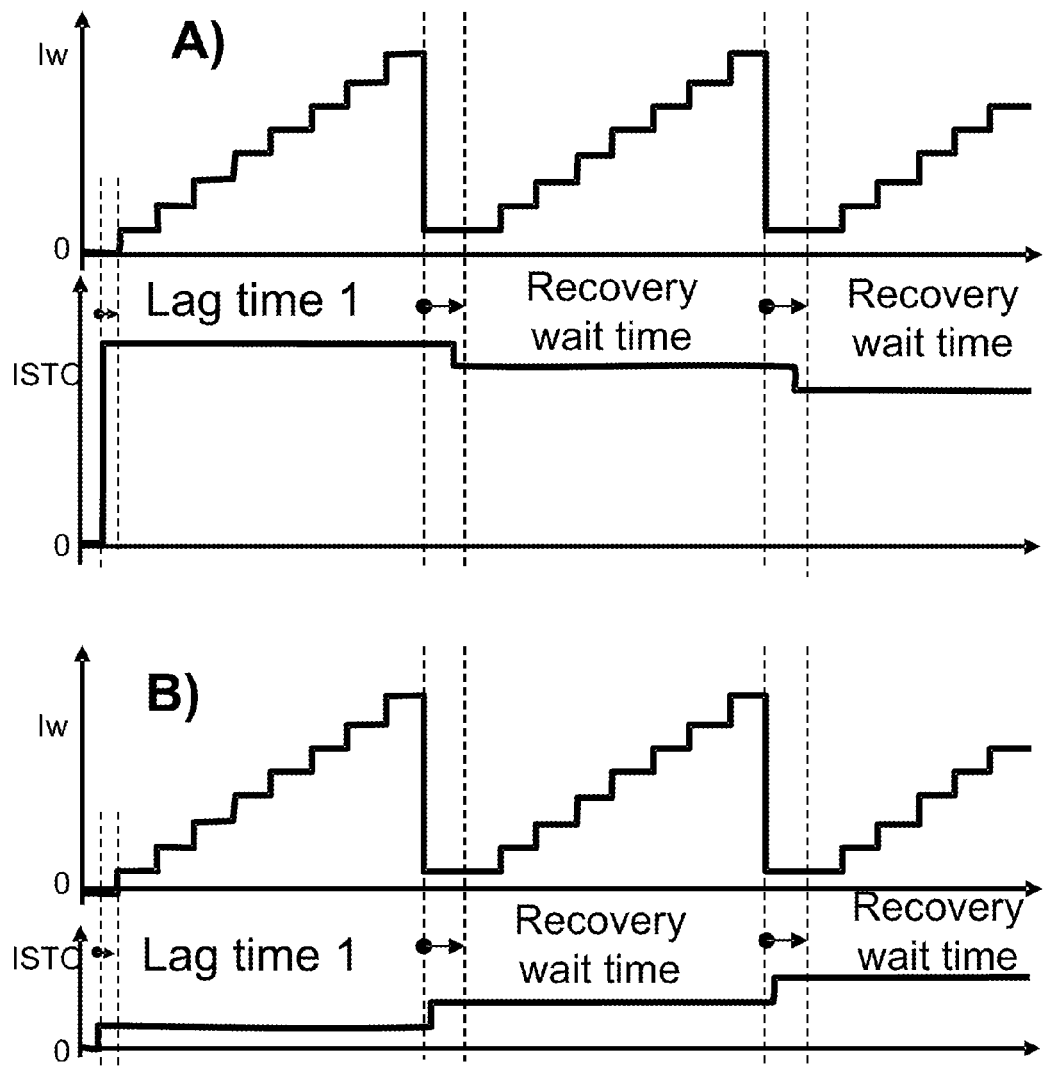
FIG. 19 is a diagram of the STO drive current and recording current timing, according to one embodiment.

FIG. 19 shows an example of the timing charts of $I_w$ and $I_{STO}$ of plots A) and B) of FIG. 18. Referring again to FIG. 19, when the $I_w$ and $I_{STO}$ are set in the initial writing of the series of matrices, the $I_{STO}$ is set first, and the $I_w$ is set following the lag time 1. Because the conditions in the non-oscillation region comprise a large $I_w$ and a small $I_{STO}$, when a test writing in which the $I_w$ is reduced in a step-wise or a continuous manner is performed, there is an increasing likelihood that oscillation will cease at the largest set value of the $I_w$. Thereupon, when an $I_{STO}$ set value is to be altered, a recovery wait time for restoration of the $I_w$ to its minimum value is required. The lower the $I_w$ and the greater the $I_{STO}$, the stronger the oscillation recovery from the stoppage state, and a lengthening of the time in which the $I_w$ is small is preferable when $I_w$ switching is performed within the recovery wait time.

Figure 20:
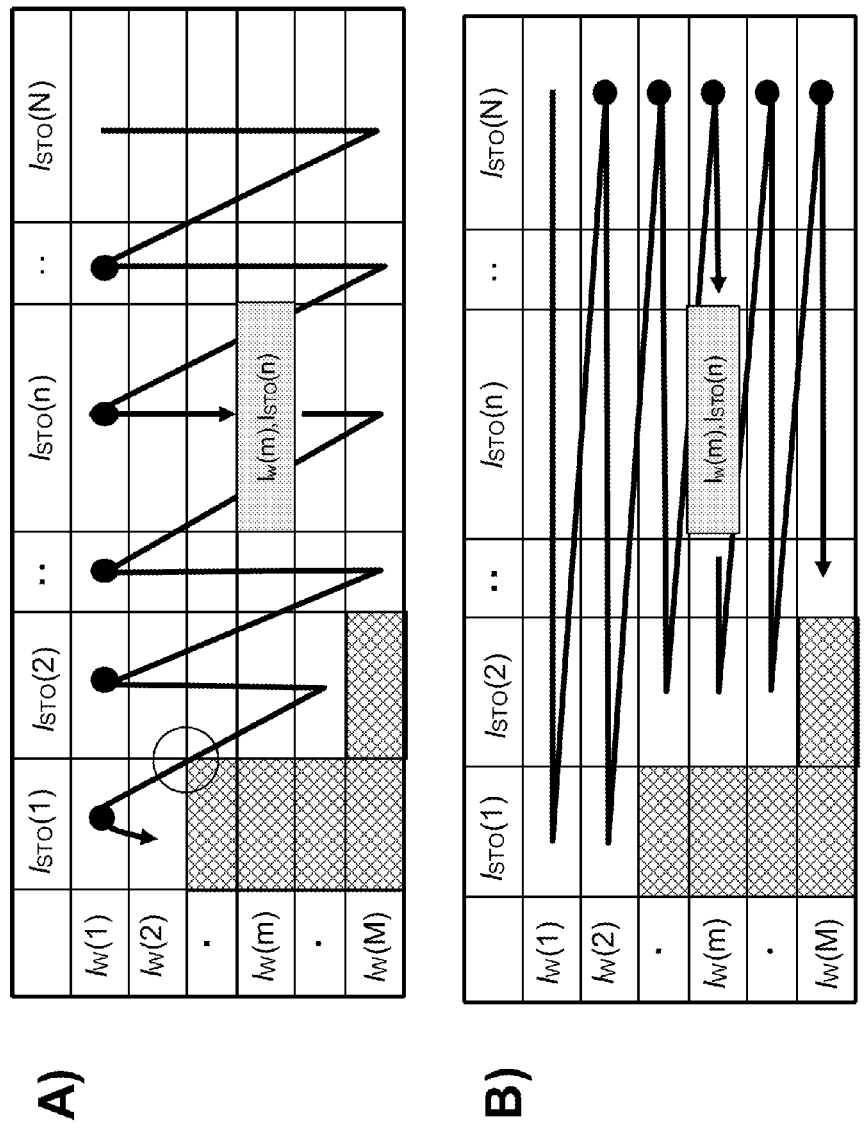
FIG. 20 is a diagram of the sequence for writing the STO drive current and recording current in which a portion of the matrix has been omitted, according to one embodiment.

In the matrices of $I_w$ and $I_{STO}$ set values during self-learning of FIG. 20, $I_w$ and $I_{STO}$ combinations in which there is no STO oscillation (hatched section of the diagram) are examined in advance, and there is no current set with respect to these combinations. In plot A), the $I_{STO}$ drive current value is fixed and the $I_w$ is increased from its minimum set value, wherein it may be expected that the write characteristics may be measured in the absence of the stoppage of STO oscillation. Furthermore, when an $I_{STO}$ value is to be switched, a pause is preferably provided at the $I_w$ minimum set value to allow for writing to be properly performed even if oscillation were to be stopped at the previous set value. This is preferable to plot B) because of the minimal $I_{STO}$ set values that incorporate combinations for which no current has been set. In plot B), the $I_w$ value is fixed and the $I_{STO}$ is decreased from its maximum set value, wherein it may be expected that the write characteristics may be measured in the absence of the stoppage of STO oscillation. Furthermore, when an $I_w$ value is switched, a pause is preferably provided at the $I_{STO}$ maximum set value to allow for writing to be properly performed even if oscillation were to be stopped at the previous set value. This is preferable to plot A) because, when a current set value is to be altered, the region of non-oscillation of the STO is not crossed. In plot (A), the non-oscillation region is crossed at the section indicated by the circle.

Figure 21:
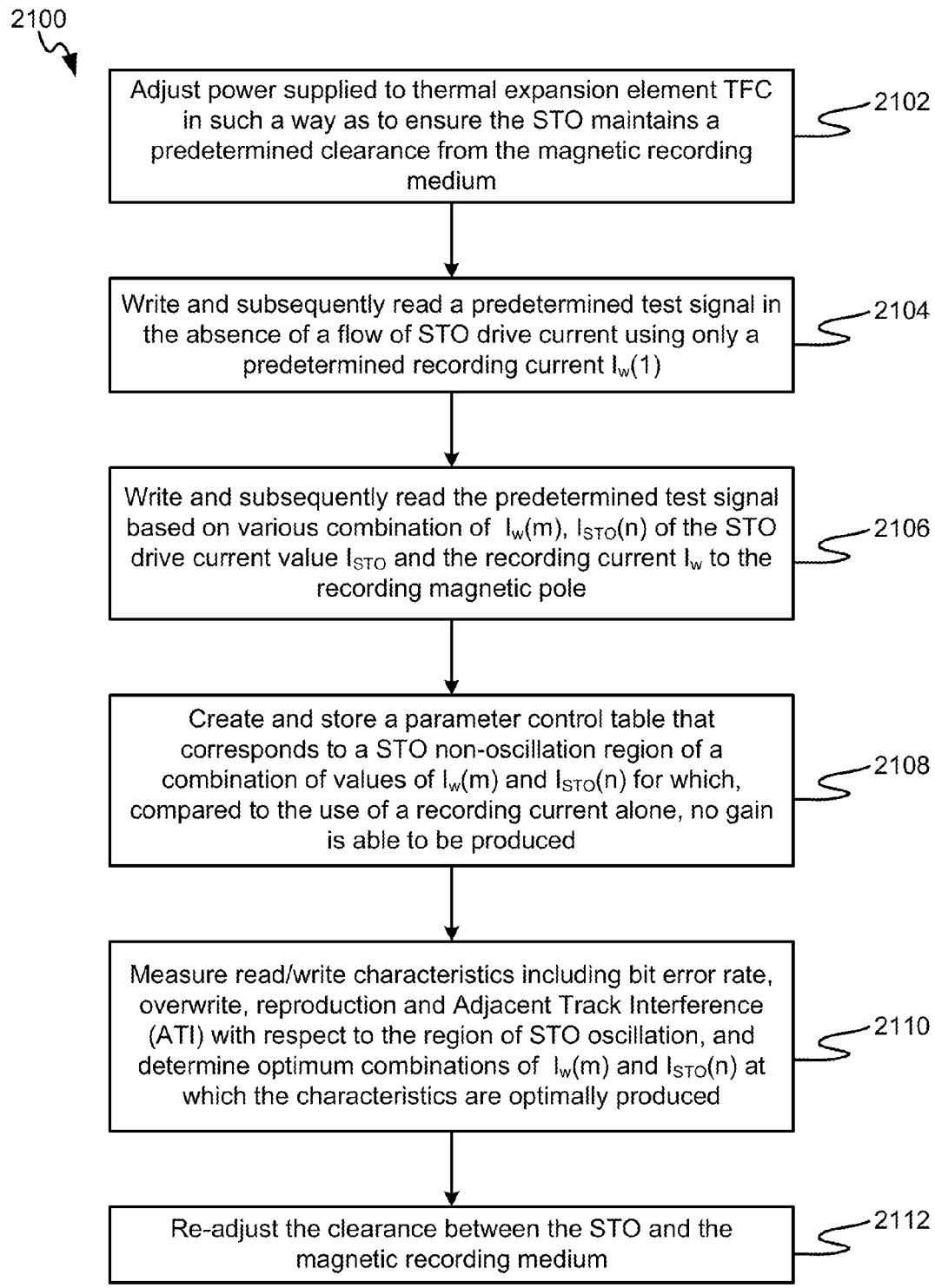
FIG. 21 is a flowchart for setting the recording parameters, according to one embodiment.

FIG. 21 is a flow diagram of a recording parameter setting based of self-learning. The specific method 2100 is derived from the matrices of $I_w$ and $I_{STO}$ set values during self-learning, examining the $I_w$ and $I_{STO}$ combinations in which there is no STO oscillation (hatched section of the diagram). An improved setting is possible when, following the clearance re-adjustment of operations 2112, 2104-2110 are repeated.

In operation 2102, power supplied to a thermal expansion element, such as a thermal fly-height control (TFC) element, is adjusted in such a way as to ensure the high-frequency oscillation element maintains a predetermined clearance from the magnetic recording medium.

In operation 2104, writing and subsequent reading of a predetermined test signal in the absence of a flow of an STO drive current is performed using only a first recording current, $I_w(1)$.

In operation 2106, writing and subsequent reading of the predetermined test signal (or some other predetermined test signal) is performed based on various combinations of $I_w(m)$, $I_{STO}(n)$ of the STO drive current value, $I_{STO}$, and the recording current, $I_w$, to the recording magnetic pole.

Any number of combinations may be used, and interpolation based on past combinations may be used to determine where a more optimum combination may be found, and this set may then be tested, in one approach. In another approach, a grid of combinations may be used that spans a usable range of values, and interpolation may be used to approximate an optimum setting combination after all values have been tested.

In operation 2108, a parameter control table is stored which describes an STO non-oscillation region corresponding to a combination of values of $I_w(m)$ and $I_{STO}(n)$ for which, compared to the use of a recording current alone, no gain is able to be produced.

In operation 2110, writing and/or reading characteristics with respect to the region of STO oscillation are measured, e.g., the writing and/or reading characteristics of the head while operating in the region of STO oscillation. Furthermore, optimum combinations of $I_w(m)$ and $I_{STO}(n)$ at which the characteristics are optimally produced are determined. The writing and/or reading characteristics may include any of the following: bit error rate, overwrite, SNR, adjacent track interference (ATI), far track interference (FTI), etc.

In operation 2112, clearance between the high-frequency oscillation element and the magnetic recording medium is adjusted to account for the optimum settings determined in operation 2110. This may be accomplished with use of the TFC element, in one approach, or any other method or apparatus known in the art.

Testing was conducted on magnetic recording that was carried out at a head medium relative speed of about 40 m/s, a magnetic spacing of about 7 nm, and a track pitch of about 50 nm. Furthermore, data was read form the magnetic medium using a GMR head having a shield interval (gap) of about 15 nm. Of course, any other settings, head types, etc., may be used as would be known in the art.

Figure 22:
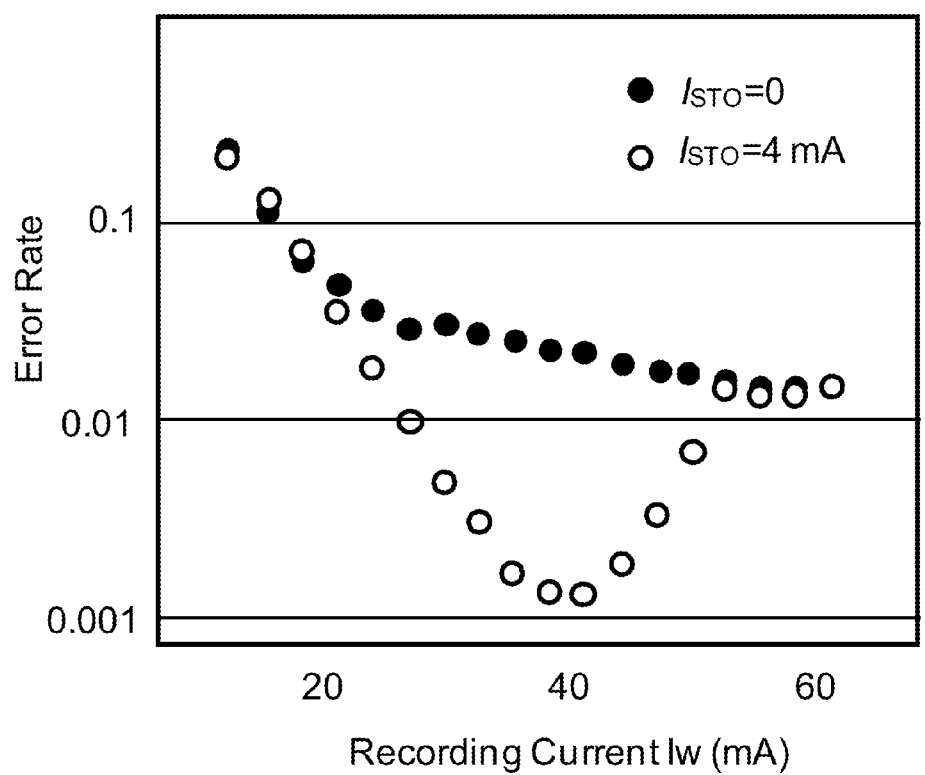
FIG. 22 is a diagram showing the recording current dependence of the leading bit error rate, according to one embodiment.

When, at an optimum STO drive current of 4 mA determined by self-learning, the recording current is changed and recording is performed using a 1024 MHz and 1300 kFCI signal, a maximum SNR of 13.1 dB was produced when the recording current was 40 mA. Similar to FIG. 5 and with no alteration to the STO drive current, FIG. 22 shows the write error rate determined for the leading bit immediately following the initiation of recording. When $I_w$ exceeds 20 mA, the difference to the case in which no current flows to the STO is marked, and an effect in which the error rate stabilizes and drops in the region of $I_w$=40 mA which represents the optimum write conditions is produced. Also, an effect whereby, for the error rates for each N bit, the change in error rate is negligible even as N increases is produced.

The use of embodiments described herein allows for the STO drive current and the write current to be able to be set to their optimum conditions and, furthermore, for the STO to be reliably oscillated immediately following the initiation of recording and, accordingly, an adequate assistance effect is produced thereby.

FIGS. 23A-23B are schematic diagrams showing the configuration of the magnetic recording device in one embodiment, with FIG. 23A being a top view, and FIG. 23B being a cross-sectional view along the line A-A' thereof.

Referring again to FIGS. 23A-23B, a recording medium 101 is fixed to a rotating bearing 104, and is rotated by a motor 100. While FIG. 23B shows an example comprising the mounting of three magnetic disks and six magnetic heads, the device need only comprise at least one magnetic disk, and at least one magnetic head. The recording medium 101 describes a disk shape, and a recording layer is fabricated on both surfaces thereof. A slider 102, which moves in essentially the radial direction along the surface of the rotating recording medium, comprises a read/write portion in its leading-edge portion. The read/write portion possesses a structure as shown in, for example, FIG. 12, and a main pole and STO are provided in the write portion.

Referring again to FIGS. 23A-23B, a suspension 106 is supported by a rotary actuator 103 by way of an arm 105. The suspension 106 comprises a function for pressing the slider 102 toward the recording medium 101 or separating it therefrom at a predetermined load. The current for driving the various constituent components of the magnetic head is supplied from an IC amplifier 113 by way of wire 108. The processing of the recording signal supplied from the recording head portion and the processing of the reproduction signal detected from the read head portion is executed by a read/write channel IC 112 as shown in FIG. 23B. In addition, the operation for the control of the magnetic recording device as a whole is based on the execution by a processor 110 of a disk control program stored in a memory 111. Accordingly, using the processor 110, the memory 111, and the read/write channel IC 112, control may be asserted over the magnetic recording device.

The write head and recording medium described above were assembled in a magnetic disk device (for recording on each surface of three 2.5 inch magnetic disks) as shown in FIGS. 23A-23B and, in the implementation of a performance evaluation thereof during magnetic field reversal, although 1000 hours of continuous write/read was carried out at an optimum STO drive current of 4 mA and recording current of 40 mA determined by self-learning using an information writing/reading device having a capacity 2TB and information transfer speed of 1.0 Gbit/s, no deterioration in the SNR or error rate of the block leading bit was observed.

In contrast, at an STO drive current of 8 mA and a recording current of 60 mA, when the same measurements were implemented, while the SNR was a high value on the order of about 0.3 dB immediately following the start of measurement and remained at this level for approximately 200 hours, thereafter the SNR deteriorated rapidly.

Figure 24:
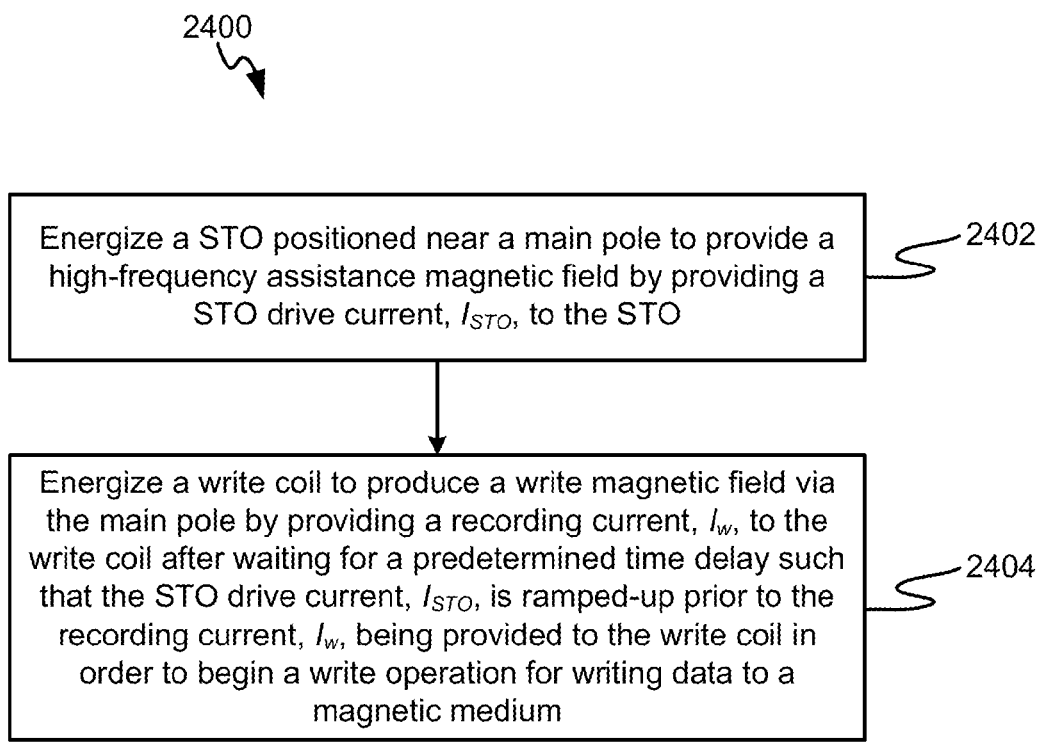
FIG. 24 shows a flowchart of a method in one embodiment.

Now referring to FIG. 24, a method 2400 for using a MAMR head is shown according to one embodiment. As an option, the present method 2400 may be implemented to operate structures such as those shown in FIGS. 1, 11-12, 14, 23A-23B, etc. Of course, however, this method 2400 and others presented herein may be used to operate magnetic structures for a wide variety of devices and/or purposes which may or may not be described herein. Further, the methods presented herein may be carried out in any desired environment. It should also be noted that any aforementioned features may be used in any of the embodiments described in accordance with the various methods.

In operation 2402, a STO positioned near a main pole is energized to provide a high-frequency assistance magnetic field by providing a STO drive current, $I_{STO}$, to the STO.

In operation 2404, a write coil is energized to produce a write magnetic field via the main pole by providing a recording current, $I_w$, to the write coil after waiting for a predetermined time delay such that the STO drive current, $I_{STO}$, is ramped-up prior to the recording current, $I_w$, being provided to the write coil in order to begin a write operation for writing data to a magnetic medium. Iso may be ramped-up in a gradual and/or stepped manner in some approaches. In the gradual manner, $I_{STO}$ may be steadily increased from a starting value to an ending value. In the stepped manner, several intermediate $I_{STO}$ values may be achieved between the starting value and the ending value, with each subsequent intermediate value being higher than a previous intermediate value. In other approaches, $I_{STO}$ may be ramped-up by application of the full drive current at the onset in a single step.

By ramping-up the $I_{STO}$, the STO oscillation region is avoided and a more stable high-frequency assistance magnetic field is produced to aid in recording data to the magnetic medium.

In a further embodiment, method 2400 may include ramping-down the recording current, $I_w$, prior to reducing the STO drive current, $I_{STO}$, in order to cease the write operation for writing data to the magnetic medium. In this way, again, the STO oscillation region is avoided and a more stable high-frequency assistance magnetic field is produced to aid in recording data to the magnetic medium.

$I_{STO}$ may be ramped-down in a manner converse to any of the methods of ramping-up, according to various embodiments.

In another embodiment, method 2400 may include determining optimum recording conditions for the MAMR head based on alteration of $I_{STO}$ and $I_w$ via writing to the magnetic medium and subsequent reading from the magnetic medium of a predetermined test signal. This predetermined test signal may be any series of 0's, 1's and/or pauses or breaks, which, being known prior to being written, may be used to determine if the writing (and possibly the reading) has been performed effectively.

In another embodiment, method 2400 may include changing the $I_{STO}$ from a larger value to a smaller value with respect to an $I_w$ set value to determine optimum recording conditions. In an alternate embodiment, the $I_{STO}$ may be changed from a smaller value to a larger value with respect to the $I_w$ set value, to determine optimum recording conditions. Furthermore, in either embodiment, a time delay may be provided for altering the $I_w$ set value at an $I_{STO}$ maximum value, and this time delay may be determined when the optimum recording conditions are determined, using any technique known in the art.

In another embodiment, method 2400 may include changing the $I_w$ from a larger value to a smaller value with respect to an $I_{STO}$ set value to determine optimum recording conditions. In an alternate embodiment, the $I_w$ may be changed from a smaller value to a larger value with respect to the $I_{STO}$ set value to determine optimum recording conditions. Furthermore, in either embodiment, a time delay may be provided for altering the $I_{STO}$ set value at an $I_w$ minimum value, and this time delay may be determined when the optimum recording conditions are determined, using any technique known in the art.

In another embodiment, method 2400 may also include ensuring that no STO oscillation occurs at the determined optimum recording conditions, and the determination that no STO oscillation is occurring may be an indication that the optimum recording conditions have been achieved.

In another embodiment, method 2400 may also include creating and storing a parameter control table which describes a STO non-oscillation region corresponding to a combination of values of $I_w$ and $I_{STO}$ for which, compared to use of a recording current alone, no gain is able to be produced. This combination of values of $I_w$ and $I_{STO}$ may then be used as the optimum operating conditions for the particular head/medium system that is tested.

In another embodiment, optimum recording conditions may be determined based on a comparison with a measurement value of $I_{STO}=0$. In this way, it may be determined whether the different operating parameters achieve better or worse performance in regard to reading/writing characteristics of the head/medium combination as compared to reading/writing characteristics achieved with no assistance magnetic field being applied.

Notably, the present invention is not limited to the working examples and embodiments described above, and the present invention encompasses various modified examples thereof. While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic data storage system, comprising:
   a microwave-assisted magnetic recording (MAMR) head; and
   a controller electrically coupled to the MAMR head for controlling operation of the MAMR head,
   wherein the MAMR head comprises:
      a main pole configured to write data to a magnetic medium using a write magnetic field;
      a write coil, wherein the write magnetic field is produced by the main pole upon a recording current, $I_w$, being provided to the write coil; and
      a spin torque oscillator (STO) positioned near the main pole, the STO being configured to provide a high-frequency assistance magnetic field to the magnetic medium upon a STO drive current, $I_{STO}$, being provided to the STO, and
   wherein the controller is configured to:
      determine a test signal to provide to the MAMR head to determine optimum recording conditions for the MAMR head and the magnetic medium, wherein the predetermined test signal omits current combinations where no STO oscillation occurs;
      determine the optimum recording conditions for the MAMR head and the magnetic medium prior to performing a write operation based on alteration of $I_{STO}$ and $I_w$ via writing to the magnetic medium and subsequent reading from the magnetic medium of the predetermined test signal; and
      ramp-up the STO drive current, $I_{STO}$, prior to providing the recording current, $I_w$, to the write coil in order to begin the write operation for writing data to the magnetic medium.

2. The magnetic data storage system as recited in claim 1, wherein the controller is further configured to ramp-down the recording current, $I_w$, prior to reducing the STO drive current, $I_{STO}$, in order to cease the write operation for writing data to the magnetic medium.

3. The magnetic data storage system as recited in claim 1, further comprising:
   the magnetic medium; and
   a drive mechanism for passing the magnetic medium over the MAMR head.

4. The magnetic data storage system as recited in claim 1, wherein the test signal is determined to avoid current combinations of values of $I_w$ and $I_{STO}$ that occur in a hysteresis zone in which no STO oscillation occurs after the STO drive current, $I_{STO}$, is increased from a region of no STO oscillation.

5. The magnetic data storage system as recited in claim 4, wherein the controller is further configured to ensure that substantially no stoppage of STO oscillation occurs during testing performed using the predetermined test signal.

6. The magnetic data storage system as recited in claim 5, wherein the controller is further configured to create and store a parameter control table which describes a STO non-oscillation region corresponding to a combination of values of $I_w$ and $I_{STO}$ for which, compared to use of a recording current alone, no gain is able to be produced.

7. The magnetic data storage system as recited in claim 1, wherein the controller is further configured to change the $I_{STO}$ from a larger value to a smaller value with respect to an $I_w$ set value, and/or to change the $I_{STO}$ from a smaller value to a larger value with respect to the $I_w$ set value, to determine optimum recording conditions.

8. The magnetic data storage system as recited in claim 7, wherein determining optimum recording conditions for the MAMR head, using a controller of a magnetic data storage system, based on alteration of $I_{STO}$ and $I_w$ via writing to the magnetic medium and subsequent reading from the magnetic medium of a predetermined test signal the controller is further configured to pause for a period of time without altering the $I_w$ set value when the current provided to the STO is at an $I_{STO}$ maximum value to allow writing to continue when STO oscillation stops.

9. The magnetic data storage system as recited in claim 1, wherein the controller is further configured to change the $I_w$ from a larger value to a smaller value with respect to an $I_{STO}$ set value to determine the optimum recording conditions, and/or to change the $I_w$ from a smaller value to a larger value with respect to the $I_{STO}$ set value to determine the optimum recording conditions.

10. The magnetic data storage system as recited in claim 9, wherein the controller is further configured to pause for a period of time without altering the $I_{STO}$ set value when the current provided to the write coil is at an $I_w$ minimum value to allow writing to continue when STO oscillation stops.

11. The magnetic data storage system as recited in claim 1, wherein the controller is further configured to determine the optimum recording conditions based on a comparison with a measurement value of $I_{STO}=0$.

12. A method for using a microwave-assisted magnetic recording (MAMR) head, the method comprising:
   determining, using a controller of a magnetic data storage system, a test signal to provide to the MAMR head to determine optimum recording conditions for the MAMR head and a magnetic medium, wherein the predetermined test signal omits current combinations where no spin torque oscillator (STO) oscillation occurs;
   determining, using the controller, optimum recording conditions for the MAMR head and the magnetic medium prior to performing a write operation based on alteration of a STO drive current, $I_{STO}$, and a recording current, $I_w$, via writing to the magnetic medium and subsequent reading from the magnetic medium of the predetermined test signal;
   energizing the STO positioned near a main pole of the MAMR head to provide a high-frequency assistance magnetic field by providing the STO drive current, $I_{STO}$, to the STO; and
   energizing a write coil to produce a write magnetic field via the main pole by providing the recording current, $I_w$, to the write coil after waiting for a predetermined time delay such that the STO drive current, $I_{STO}$, is ramped-up prior to the recording current, $I_w$, being provided to the write coil in order to begin the write operation for writing data to the magnetic medium.

13. The method as recited in claim 12, further comprising ramping-down the recording current, $I_w$, using the controller, prior to reducing the STO drive current, $I_{STO}$, in order to cease the write operation for writing data to the magnetic medium.

14. The method as recited in claim 12, wherein the determining the test signal comprises avoiding adding current combinations of values of $I_w$ and $I_{STO}$ to the test signal that occur in a hysteresis zone in which no STO oscillation occurs after the STO drive current, $I_{STO}$, is increased from a region of no STO oscillation.

15. The method as recited in claim 12, further comprising:
   changing the $I_{STO}$ from a larger value to a smaller value with respect to an $I_w$ set value, and/or to change the $I_{STO}$ from a smaller value to a larger value with respect to the $I_w$ set value, to determine optimum recording conditions; and pausing for a period of time without altering the $I_w$ set value when the current provided to the STO is at an $I_{STO}$ maximum value to allow writing to continue when STO oscillation stops.

16. The method as recited in claim 12, further comprising:
changing the $I_w$ from a larger value to a smaller value with respect to an $I_{STO}$ set value, and/or to change the $I_w$ from a smaller value to a larger value with respect to the $I_{STO}$ set value to determine optimum recording conditions; and pausing for a period of time without altering the $I_{STO}$ set value when the current provided to the write coil is at an $I_w$ minimum value to allow writing to continue when STO oscillation stops.

17. The method as recited in claim 12, further comprising ensuring that substantially no STO oscillation stoppage occurs during testing performed using the predetermined test signal.

18. The method as recited in claim 12, further comprising creating and storing, using the controller, a parameter control table which describes a STO non-oscillation region corresponding to a combination of values of $I_w$ and $I_{STO}$ for which, compared to use of a recording current alone, no gain is able to be produced.

19. The method as recited in claim 12, further comprising determining the optimum recording conditions, using the controller, based on a comparison with a measurement value of $I_{STO}=0$.

20. An apparatus, comprising:
at least one microwave-assisted magnetic recording (MAMR) head, each MAMR head comprising:
 a main pole configured to write data to a magnetic medium using a write magnetic field;
 a write coil, wherein the write magnetic field is produced by the main pole upon a recording current, $I_w$, being provided to the write coil; and
 a spin torque oscillator (STO) positioned near the main pole, the STO being configured to provide a high-frequency assistance magnetic field to the magnetic medium upon a STO drive current, $I_{STO}$, being provided to the STO;
the magnetic medium;
a drive mechanism for passing the magnetic medium over the at least one MAMR head; and
a controller electrically coupled to the at least one MAMR head for controlling operation of the at least one MAMR head, the controller being configured to:
 provide the STO drive current, $I_{STO}$, to the STO to provide the high-frequency assistance magnetic field;
 provide the recording current, $I_w$, to the write coil to produce the write magnetic field via the main pole;
 determine a test signal to provide to the at least one MAMR head to determine optimum recording conditions for the at least one MAMR head and the magnetic medium, wherein the predetermined test signal omits current combinations where no STO oscillation occurs;
 determine the optimum recording conditions for the MAMR head prior to performing a write operation based on alteration of $I_{STO}$ and $I_w$ via writing to the magnetic medium and subsequent reading from the magnetic medium of the predetermined test signal;
 ramp-up the STO drive current, $I_{STO}$, prior to providing the recording current, $I_w$, to the write coil in order to begin the write operation for writing data to the magnetic medium; and
 ramp-down the recording current, $I_w$, prior to reducing the STO drive current, $I_{STO}$, in order to cease the write operation for writing data to the magnetic medium.

* * * * *

UNITED STATES PATENT AND TRADEMARK OFFICE
CERTIFICATE OF CORRECTION

PATENT NO.        : 9,007,723 B1  
APPLICATION NO.   : 14/106390  
DATED             : April 14, 2015  
INVENTOR(S)       : Igarashi et al.

Page 1 of 1

It is certified that error appears in the above-identified patent and that said Letters Patent is hereby corrected as shown below:

In the specification:

col. 1, line 28 replace "write read" with --write and read--;

col. 3, line 2 replace "coil, a" with --coil, and a--;

col. 6, line 5 replace "(f)" with --(*f*)--;

col. 8, line 58 replace "$I_{STO}=2$ mA" with --$I_{STO}=5$ mA--;

col. 9, line 19 replace "field captured" with --field and captured--.

In the claims:

col. 20, line 40, claim 12 replace "signal:" with --signal;--.

Signed and Sealed this  
Twenty-ninth Day of December, 2015

Michelle K. Lee  
*Director of the United States Patent and Trademark Office*